(12) United States Patent
Maier-Avignon et al.

(10) Patent No.: US 11,863,617 B1
(45) Date of Patent: Jan. 2, 2024

(54) DYNAMIC DECENTRALIZED HIERARCHICAL HOLON NETWORK SYSTEM

(71) Applicant: Accenture Global Solutions Limited, Dublin (IE)

(72) Inventors: Thorsten Maier-Avignon, Dunzweiler (DE); Erich Rutz, Otterberg (DE); Jörg Von Blon, Schönenberg Kübelberg (DE); Michael Klaus Kreitmann, Kaiserslautern (DE); Karin Buchheit-Mayer, Zweibrücken (DE); Atl Rodolfo Marsch Martinez, Saarbrücken (DE)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/990,486

(22) Filed: Nov. 18, 2022

(51) Int. Cl.
*H04L 67/104* (2022.01)
*H04L 67/1074* (2022.01)
*H04L 12/42* (2006.01)

(52) U.S. Cl.
CPC .......... *H04L 67/1044* (2013.01); *H04L 12/42* (2013.01); *H04L 67/1078* (2013.01)

(58) Field of Classification Search
CPC .. H04L 12/42; H04L 67/1044; H04L 67/1078
See application file for complete search history.

(56) References Cited

U.S. PATENT DOCUMENTS

| 10,198,182 B2* | 2/2019 | Adler | G06Q 90/00 |
| 10,318,154 B2* | 6/2019 | Adler | H04L 67/1095 |
| 2006/0282505 A1* | 12/2006 | Hasha | H04L 12/42 709/207 |
| 2009/0319684 A1* | 12/2009 | Kakivaya | H04L 12/42 709/238 |

OTHER PUBLICATIONS

Shaker, Ayman, et al., Self-Stabilizing Structured Ring Topology P2P Systems, 2005, pp. 1-8, Departments of Electrical and Computer Engineering and Computer Science N. C. State University.

* cited by examiner

*Primary Examiner* — George C Neurauter, Jr.
(74) *Attorney, Agent, or Firm* — Crowell & Moring LLP

(57) ABSTRACT

Systems and methods for data storage and data streaming in decentralized, self-organized networks are provided. A plurality of computing devices are disposed in a unidirectional communication ring having a plurality of serially-connected spikes. Each spike includes n computing devices, and n×p connections directly connecting each of the n computing devices to p downstream computing devices. Each computing device is configured to request and receive an inventory of the plurality of computing devices; select a computing device from the plurality of computing devices; transmit a join request comprising the inventory to the selected computing device; and request reorganizing the unidirectional communication ring in response to the receipt of the transmitted join request after propagation through each of the plurality of spikes of the unidirectional communication ring.

20 Claims, 16 Drawing Sheets

DYNAMIC DECENTRALIZED HIERARCHICAL HOLON NETWORK SYSTEM

TECHNICAL FIELD

This disclosure relates to decentralized hierarchical networks and more specifically data storage and data streaming in decentralized, self-organized networks.

BACKGROUND

Present decentralized data storage networks suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
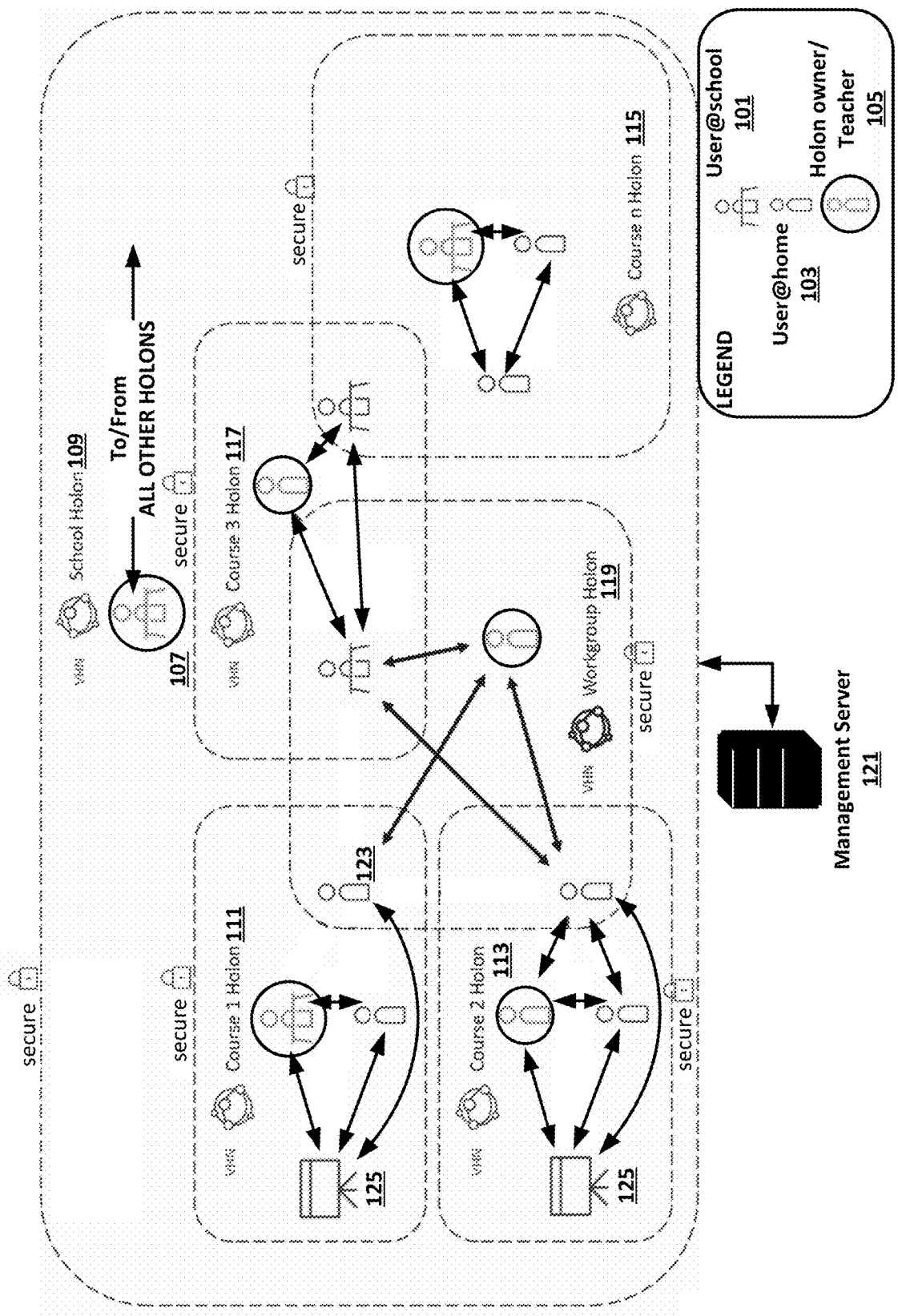
FIG. 1 illustrates an example dynamic, decentralized hierarchical network system of Holons in an example school scenario.

According to some embodiments, a virtual Holon network includes a plurality of computing devices disposed in a unidirectional communication ring comprising a plurality of serially-connected spikes, wherein each spike includes n computing devices, and n×p connections directly connecting each of the n computing devices to p downstream computing devices. Each computing device is configured to request and receive an inventory of the plurality of computing devices, select a computing device from the plurality of computing devices, transmit a join request comprising the inventory to the selected computing device, and request reorganizing the unidirectional communication ring in response to receipt of the transmitted join request after propagation through each of the plurality of spikes of the unidirectional communication ring.

According to some embodiments, a method of configuring a virtual Holon network comprising unidirectional communication ring, includes requesting and receiving an inventory of a plurality of computing devices communicably coupled by a plurality of spikes in the unidirectional communication ring. The method further includes selecting a computing device from the plurality of computing devices. The method further includes transmitting a join request comprising the inventory to the selected computing device. The method further includes requesting reorganizing of the unidirectional communication ring in response to receiving the transmitted join request after propagating the joint request through at least some of the plurality of spikes of the unidirectional communication ring.

One interesting feature of the systems and methods described herein may be that it provides a low cost, sustainable, easily maintainable, secure, and General Data Protection Regulation (GDPR)-compliant system for communication and data sharing without needing to rely on a central server. Another interesting feature may be that the systems and methods described herein avoid relying on a central data storage, may be that the systems and methods described herein provide self-organized, decentralized data streaming confined to members of a dynamic organizational units known as "Holons."

As used herein, the term "Holon" refers to a hierarchical group of users acting as secure, token-protected virtual networks, which are accessible only by members of the Holon. Each Holon may support any number of sub-Holons. Data within a Holon is only available to members of the Holon and may be kept current by synchronizing with Holon member data repositories. Members of a sub-Holon may access data in a parent or upper level Holon.

As used herein, the term "Virtual Holon Network" (VHN) refers to a self-organizing network that exists between member computing devices of a Holon. Data, chats, and streams may be shared between the Holon member computing devices across the VHN and may not be shared with non-members of the Holon, across Holons, or with other VHNs. Lists of Holon members and/or user rights may be properties common to the VHN. The VHN may configure a plurality of computing devices to communicate in a unidirectional chain-ring topology, which will be subsequently described.

As used herein, the term "Holon chain spike" refers to a collection of computing devices within the VHN chain-ring that share the same subscribers and publishers.

As used herein, the term "broken chain" refers to a VHN chain-ring where one complete Holon chain spike is no longer reachable. For instance, all devices within a Holon chain spike may log off the system 100, or all devices within a Holon chain spike may share a same network that shuts down; either case may cause a complete Holon chain spike to be unreachable. In this case, messages may no longer be propagated through the VHN chain-ring, which may cause the chain-ring to self-reorganize differently by executing a VHN chain-ring creation algorithm.

As used herein, the term "Holon chain spike size" refers to the number of computing devices in each Holon chain spike. The Holon chain spike size default value may be defined when a Holon is initially configured.

As used herein, the term "upstream" refers to a direction opposite of the transfer direction of data on the unidirectional chain-ring.

As used herein, the term "downstream" refers to a same direction as the transfer direction of data on the unidirectional chain-ring.

As used herein, the term "Holon chain publisher spike" refers to a prior, upstream spike in the unidirectional chain-ring from which a computing device receives data. In other words, the Holon chain publisher spike may be said to be the upstream spike from one or more given computing devices.

As used herein, the term "Holon chain subscriber spike" refers to a subsequent spike in the chain-ring to which a computing device sends data. In other words, the Holon chain subscriber spike may be said to be the downstream spike from a given computing device.

As used herein, the term "member inventory" refers to a list of all active computing devices and users within a VHN. The member inventory may be provided by the management server on request from, or pushed to, a computing device. The member inventory may be kept up-to-date by the member computing devices of the VHN. Inactive and logged out computing devices may be detected and information may be sent by the member computing device(s) to delete those inactive computing devices from the member inventory. Each computing device listed in the member inventory may be represented by a unique identifier that is assigned by the management server upon registering with the decentralized hierarchical network system 100.

As used herein, the term "member inventory size" refers to a number of computing devices in the member inventory.

As used herein, the term "member" may interchangeably refer to a user or the user's computing device that is used to access a Holon in which the user is authorized to participate in.

For each figures showing a flowchart, rectangular-shaped blocks represent entities and steps, while diamond-shaped blocks indicate decision points.

FIG. 1 illustrates an example dynamic, decentralized hierarchical network system 100 of Holons (illustrated by the dotted boxes) in an example school scenario. It should be understood that the school scenario is described as an example merely to facilitate discussion of the structures and functions of the decentralized hierarchical network system 100 and should not be construed to limit the scope of the present subject matter. The school may be considered a hybrid model where some Holon members (e.g., User@home) 103 may attend courses virtually from home while other Holon members (e.g., User @ school) 101 may attend in-person at the school. As shown in FIG. 1, one Holon 109, and correspondingly, one VHN may exist for the school itself, as well for each of several courses 111/113/115/117. Each user may be a member of more than one Holon. For instance, a workgroup Holon 119 may also exist that includes member users belonging to course Holons 111/113/117. Each of course Holons 111/113/115 may include a teacher member 105 and student members 101/103. Each course Holon, particularly Course 1 Holon 111 and Course 2 Holon 113 may allow for sharing presentations 125 with other member users of the Holon and even other Holons. As previously indicated, however, sharing of data may be limited to the Holon to which the data belongs; e.g., data stored on a computing device of Holon "A" may only be shared with other members of Holon "A". Finally, a management server 121 may be communicably coupled with the school Holon 109.

In this example, each member user of Course 1 Holon 111 may only access data shared within the Course 1 Holon and School Holon 109. User@home 123, however, may access data shared within any Holon to which he/she belongs, including Workgroup Holon 119, Course 1 Holon 111, and School Holon 109. Holon owner/teacher@school 107, who is a member of only School Holon 109, may access data of only School Holon 109.

Members of a Holon may have varying privileges and/or rights. For instance, a technical administrator member may be defined for a Holon. The technical administrator member may have rights that, in the example of FIG. 1, allow: creating the overall school Holon 109, creating class-level Holons 111/113/115/117, deleting Holons, defining tags, and creating a notification template.

A functional administrator member may also be defined for a Holon. The functional administrator member may have rights that allow: creating a class-level Holon 111/113/115/117, confirming student registration to the school Holon 109, confirming teacher members, confirming parent members, adding teachers to a Holon, removing teachers, students, or parent members from the school Holon 109, and substituting a teacher in a Holon.

As previously mentioned, a teacher member 105 may also be defined for a Holon. The teacher member 105 may have rights that allow: creating a course Holon 111/113/115/117, adding a member to a course Holon 111/113/115/117, starting a chat, starting a stream, adding a whiteboard for streaming, creating an output file from a whiteboard, creating a notification (based on a template), receiving a notification, creating tags that specify access and storage time, maintaining tag access, adding a file to the Holon data repository, adding a tag to a file, and deleting a file from the Holon data repository.

As previously mentioned, a student member 101/103 may also be defined for a Holon. The student member 101/103 may have rights that allow: adding a file to the Holon data repository, tagging a file, changing a tag of owned files, accessing a file (i.e., read/write/delete) depending on the associated tags, accessing a stream, starting a stream, and receiving a notification.

The member users of each Holon may participate in a variety of activities. For instance, within a course Holon 111/113/115/117, any member users may provide documents, stream audio, video, or other applications (e.g., screen sharing), and divide the members of the course Holon into study group sub-Holons. Within a study group sub-Holon, the members may share documents, chat, provide a group result as a file, and/or stream to the parent Holon. The teacher member 105 of the course Holon 111/113/115/117 may allow common discussion amongst the Holon student members 101/103 and/or set a homework assignment.

Each member user of the school Holon 109 may interact using a computing device, such as a smartphone, tablet computer, laptop computer, desktop computer, set-top box, personal digital assistant, or the like. The computing device may execute a client application that provides: authentication features, such as multi-factor authentication when logging in to a VHN; authorization features; a user interface that allows the member user to interact with other Holon members and the VHN; encrypted file storage; chat features;

polling API functions; a streaming component; secure communication features; and presentation features (e.g., whiteboard). The client application may be provided standalone, and/or in conjunction with a web application accessible through a conventional web browser.

A management server 121 may generally provide administration functions for the Holon network using a backend application, which will be subsequently described in greater detail. The management server 121 may be a relatively simple, low-cost, low-performance machine and may be used for authentication when the system 100 is initially set up and user management thereafter. Unlike conventional management servers, management server 121 may not be used for data storage. Instead, data may be shared between the users and devices of the system 100. Communication between users and devices of the system 100 may not be handled by the management server 121.

Figure 2:
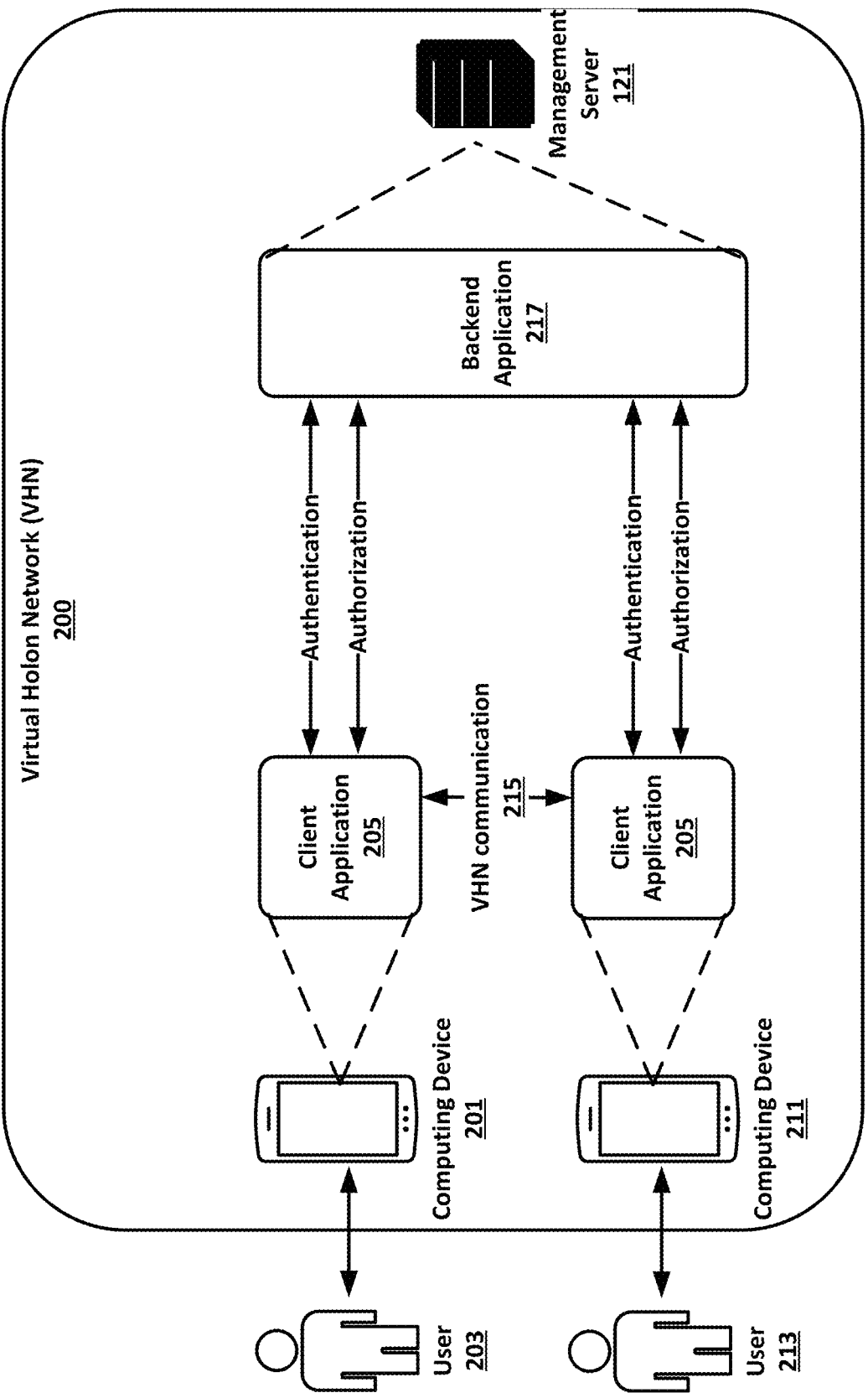
FIG. 2 illustrates a block diagram showing relationships between participants and components of an example Virtual Holon Network.

FIG. 2 illustrates a block diagram showing relationships between participants and components of an example VHN 200. Two users 203/213 may interact with the VHN 200 using a respective computing device 201/211. Each computing device 201/211 may execute a client application 205 that may permit each user 203/213 to authenticate and become authorized via a backend application 217 that may execute on management server 121. Users 203/213 may also include Holon owners, teachers, or administrators. Administrator 215 may use the management server 121 executing backend application 217 to define Holons.

The client application 205 may be standalone software installed and executed on the respective computing devices 201/211 and/or in conjunction with a web application accessible through a conventional web browser installed on the computing devices 201/211.

The backend application 217 may be standalone software installed on management server 121 and/or in conjunction with a web application accessible through a conventional web browser installed on the management server 121. The backend application 217 may be an administrative application that provides: Holon management functions, such as creating and deleting Holons; importing and exporting of APIs; providing user online status; polling API functions; authentication features; VPN management; monitoring and metrics; and logging/audit trailing features.

Figure 14:
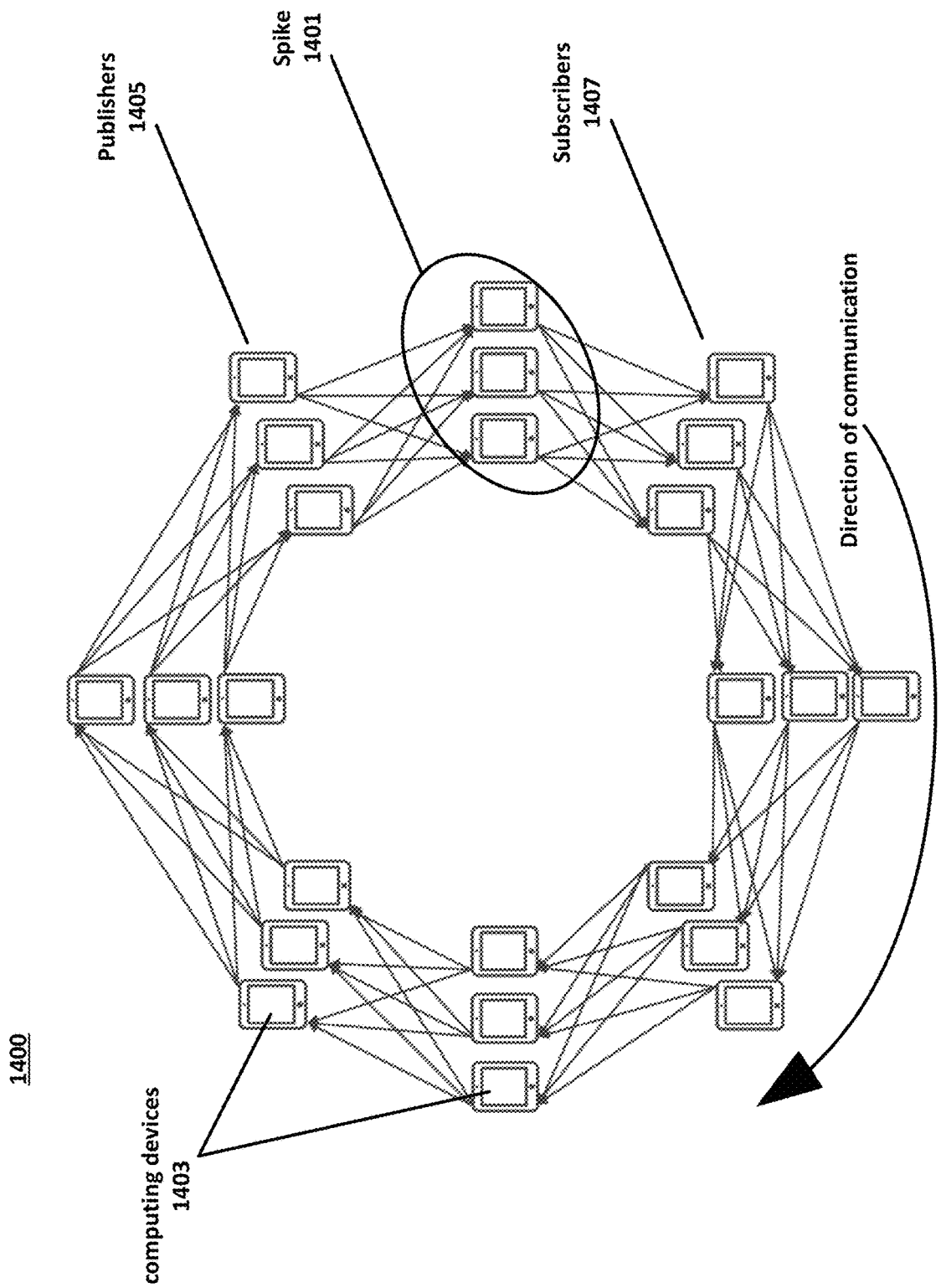
FIG. 14 illustrates an example chain-ring having three computing devices in each spike.

Each member computing device 201/211 of a Holon may only need to keep open a limited number of communication channels to a limited number of other members, thus reducing bandwidth and processing demands on any one computing device 201/211. The VHN 200 for each Holon may automatically organize itself into a chain-ring with n computing devices 201/211 in each serially-connected spike of the chain-ring. In an example, the number of computing devices 201/211 in each serially-connected spike of the chain-ring may be three. FIG. 14 illustrates an example chain-ring 1400 having three computing devices 1403 in each spike 1401. The sharing of information between the computing devices of FIG. 1 may be implemented physically using the illustrated arrangement of FIG. 14. Management server 121 (not shown) may reside outside of the chain ring. Each device in the chain ring 1400 may contact management server 121 at regular intervals to execute a specification such as a rebuild of the chain ring. Each of those three computing devices 1403 may hold open, for example, three connections to the subsequent three computing devices in the chain-ring 1400. Therefore, each serially-connected spike of the chain-ring 1400 may include a predetermined number, such as three, computing devices 1403 and a predetermined number of total connections, such as nine total connections (in this example: 3 computing devices×3 connections each). More generally, where n publisher computing devices are provided in a first spike and p subscriber computing devices are provided downstream in a second spike, n×p connections may be provided such that each of the n publisher computing devices may be directly connected to every p subscriber computing device. Alternatively, each spike may contain a same number of n computing devices where for each serially-connected spike 1401 of the chain-ring 1400, $n^2$ connections may be provided such that each publisher computing device 1405 may be directly connected, with no intervening computing devices, to each subscriber computing device 1407 downstream. While each serially-connected spike 1401 of the chain-ring 1400 may be limited to n computing devices 1403, each computing device 1403 forming the chain-ring 1400 may communicate with any other computing device 1403 indirectly, if not directly. Each computing device 1403 in the chain-ring 1400 of the VHN 200 may be both a subscriber and a publisher to a limited number of other computing devices 1403. As previously indicated, a subscriber may be located downstream from a position on the chain-ring 1400 while a publisher may be located upstream from a position on the chain-ring 1400. Accordingly, data may be communicated along the chain-ring 1400 from publisher to subscriber unidirectionally. Data updates (e.g., files, chats, device inventory) may be propagated downstream through the chain-ring 1400 from serially-connected spike 1401 to spike; i.e., from publisher to subscriber computing device 1403. As each computing device 1403 may maintain communication with only a relatively small number of other computing devices 1403, the propagation speed may be limited only by latency rather than bandwidth and latency.

Figure 3:
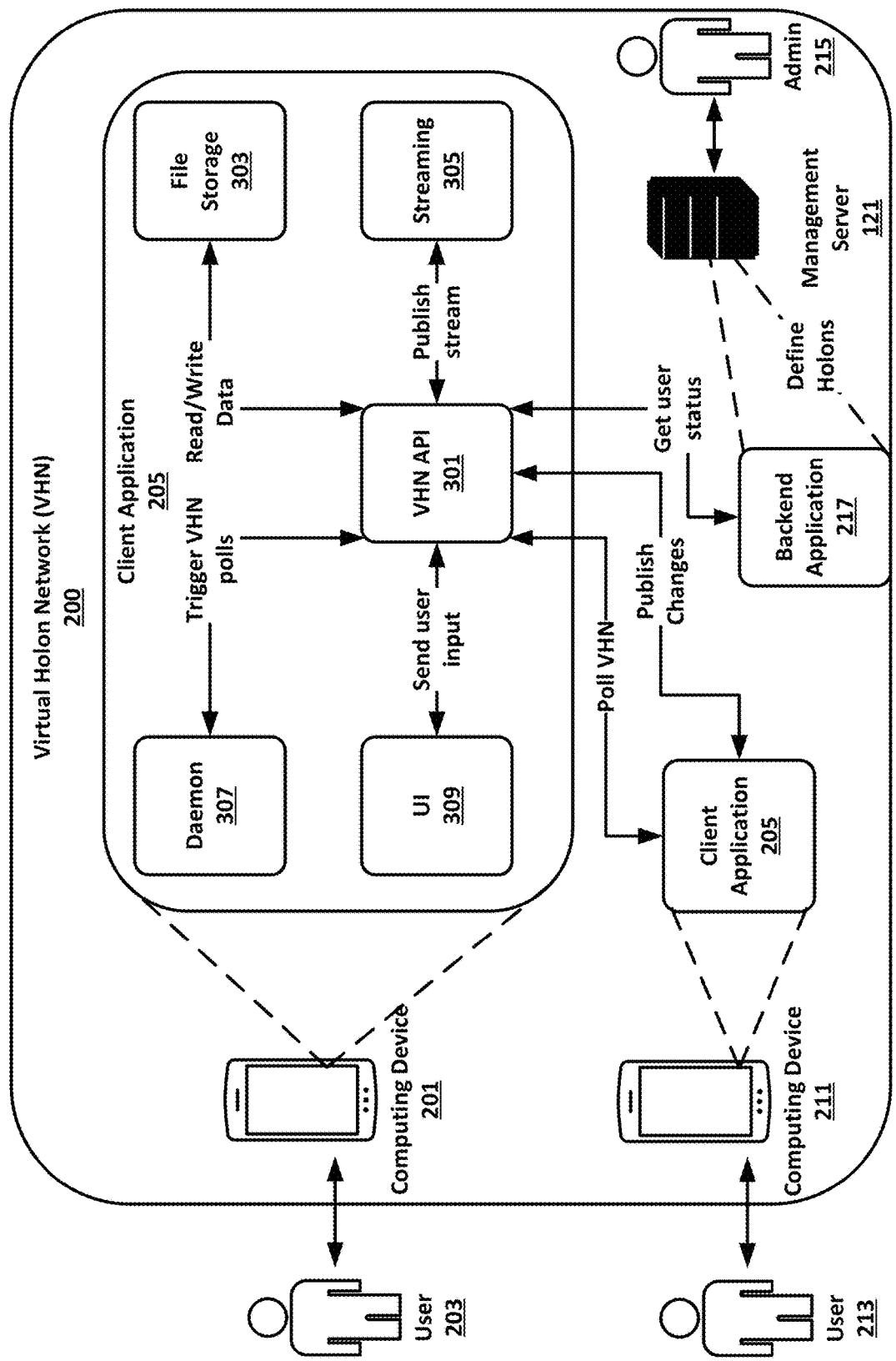
FIG. 3 illustrates a block diagram showing additional detail of the client application.

FIG. 3 illustrates a block diagram 300 showing additional detail of the client application 205. Specifically, FIG. 3 shows that the client application 205 includes a daemon 307, file storage 303, user interface (UI) 309, VHN API 301, and streaming interface 305.

The VHN API 301 may provide an interface for controlling various aspects of the client application 205, including the daemon process 307, file storage 303, streaming interface 305, and UI 309. The VHN API 301 may also provide an interface for the client application 205 to interact with external software and hardware components, such as computing device 211 via its respective client application 205, and the management server 121 via backend application 217. VHN API 301 may provide calls to functions or routines to receive user input and display output via the UI 309, to publish streaming video/audio or data using the streaming interface 305, to read and/or write data from and to the file storage 303, to trigger VHN polls to the daemon 307, to send and receive VHN polls to and from other computing devices (e.g., 211), to publish changes to and from other computing devices, and to receive and respond to status requests from management server 121. As used herein, polling contacts all required computing devices at frequent intervals. For instance, a computing device may poll all other computing devices in VHN 200 to determine whether a chat file with a newer watermark is available and should be used to update the chat file(s) stored in the polling computing device.

The daemon 307 may execute in the background on computing device 201 and send and receive VHN polls without being instructed by a user. Typically, daemon 307 may be provide periodic actions or react on system actions, such as to trigger periodic poll requests as previously described.

The UI 309 may be provided to allow the user 203 to graphically interact with the VHN 200 using the client application 205.

File storage 303 may be a local data repository embodied in a computer-readable storage device of the computing device 201/211. The file storage 303 may be a separately defined data storage within the computer-readable storage device. Data allocated to file storage 303 may be shared with other members of a Holon and kept current by maintaining an inventory of files stored in file storage 303, which will be subsequently described in more detail.

The streaming interface 305 may allow the client application 205 to provide streaming audio, video, or other data (e.g., real-time whiteboard, screen-sharing, etc.) to other members of the VHN 200. Streams may be propagated within a Holon through a streaming tree structure in that each computing device 201/211 may propagate the stream to a predefined number of other computing devices 201/211. In this way, bandwidth limits of each computing device 201/211 may not be exceeded. The streaming tree structure may be uniquely generated by an algorithm for each Holon. Each computing device 201/211 within the Holon may calculate the same tree. Computing devices 201/211 with low latency may be at a root level, while computing devices 201/211 with a high latency may be at the leaf level. Because different computing devices 201/211 may have different latencies in communication, the tree algorithm may calculate different trees based on the computing device(s) 201/211 that initiate the stream. If one tree node is lost because a member logs out, a failover to other sibling members of the parent node may occur.

Figure 4:
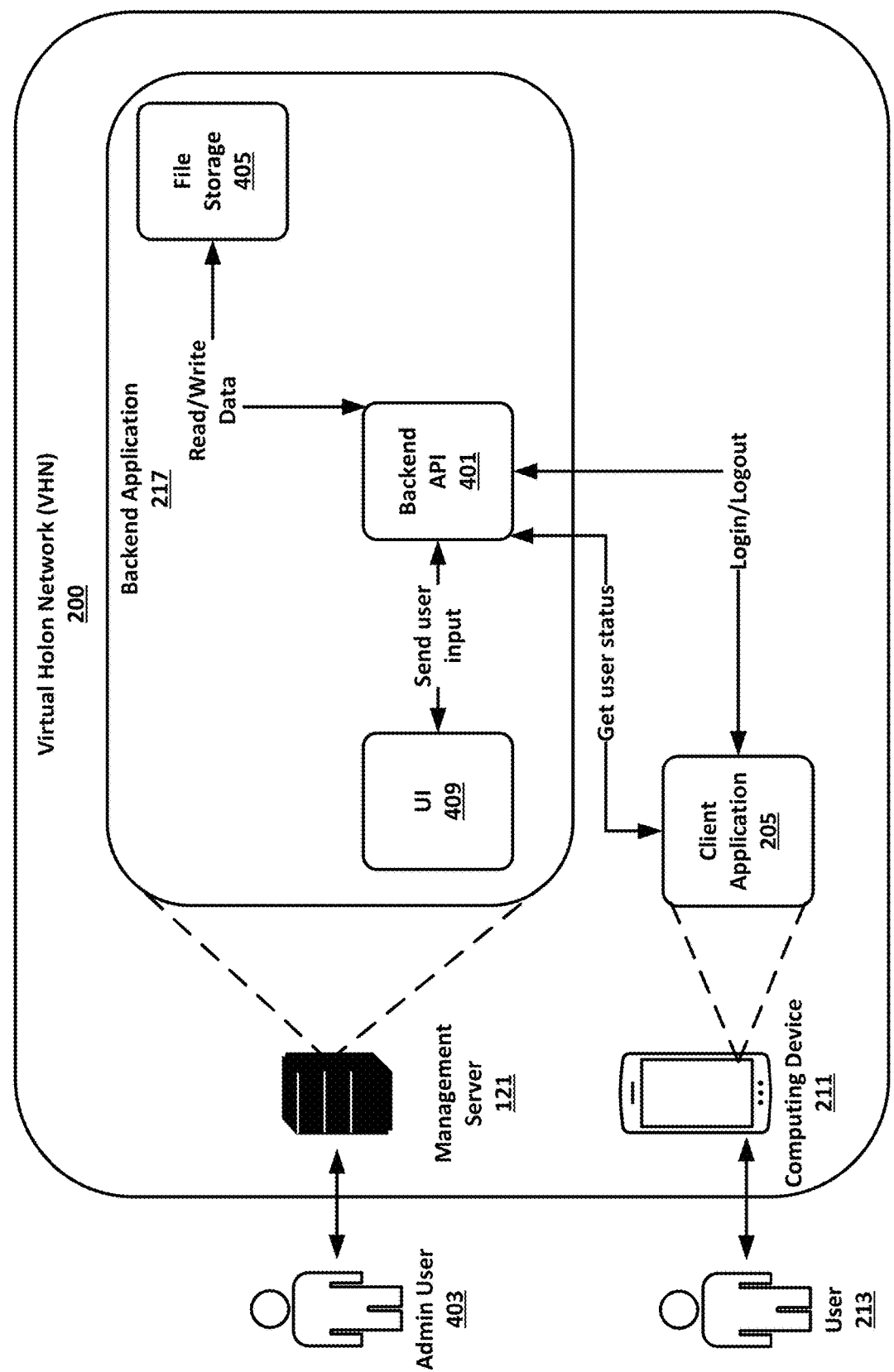
FIG. 4 illustrates a block diagram showing additional detail of the backend application.

FIG. 4 illustrates a block diagram 400 showing additional detail of the backend application 217. Specifically, FIG. 4 shows that the backend application 217 includes a UI 409, backend API 401, and file storage 405.

The backend API 401 may provide calls and functions for controlling various aspects of the backend application 217, including the UI 409 and file storage 405. The backend API 401 may also provide an interface for the backend application 217 to interact with external software and hardware components, such as computing device 211 and its client application 205. The backend API 401 may further include calls to functions or routines to receive user input and display output via the UI 409, to read and/or write data from and to the file storage 405, to request and receive user status from a client application 205, and to provide a login/logout procedure for client application 205 to and from the VHN 200. The backend API 401 may also include a call that returns an object containing information including: a list of Holons a user is assigned to according to a Holon identifier and a Holon name; a member inventory that lists all users with which the user has at least one common Holon assignment according to the user's name, IP address, and login state; and a reference table that may map all users to all Holons. This member inventory object may be returned to the user (e.g., 203) via the calling computing device (e.g., 201) in a condensed/compressed format to minimize input/output traffic. This object, including all of the information contained within this object, may be cached. If the content of this object remains unchanged and valid, the content of the object may be served from cache. The cache may be invalidated when a user logs in, logs out, or changes Holon assignments.

The UI 409 may be provided to allow an administrator 403 to graphically interact with the VHN 200.

File storage 405 may be a local data repository embodied in a computer-readable storage device of the management server 121. The file storage 405 may be a separately defined data storage within the computer-readable storage device where data shared with other members of a Holon and to be transferred within the VHN 200 may be stored. File storage 405 may store a user repository of all users registered in the decentralized hierarchical network system 100 as well as a listing of which Holons each user is assigned to. For instance, the user repository may include information such as: user master data (name address, phone number, e-mail, birth date, or the like); user state (active, frozen, deleted, or the like); user role (administrator, teacher, student, parent, or the like); logged in flag (true or false); IP address of current login; list of Holons the user is assigned to; access token; and access token expiration date/time. The IP address and the logged in flag may be updated any time the corresponding user logs in or logs out. The file storage 405 may also store a Holon data repository of all Holons created in the decentralized hierarchical network system 100. Each Holon may be assigned a unique identifier and a reference to its direct-parent Holon. The Holon data repository may include information such as: Holon identifier; Holon name; description; parent Holon identifier; creation date; and creating user.

Figure 5:
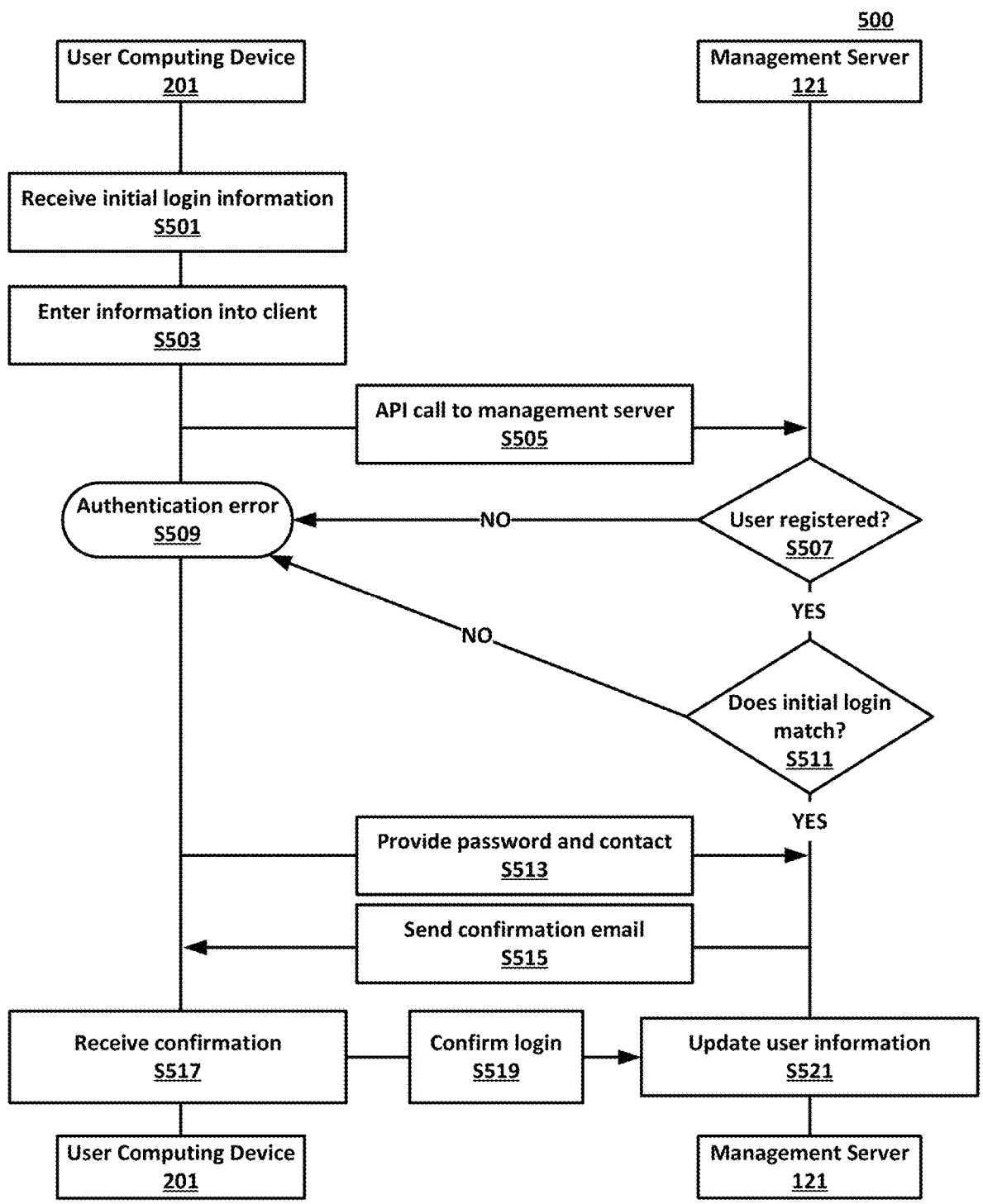
FIG. 5 illustrates a swim-lane diagram of an example initial authentication flow between a user computing device.

FIG. 5 illustrates a swim-lane diagram of an example authentication flow 500 between a member computing device (e.g., computing device 201) and the management server 121 where the member computing device is attempting to log in to the VHN 200 for the first time. Each step shown and described as performed by the computing device 201 may be equivalently performed by the user 203 or by both the user 203 and the computing device 201 in combination without departing from the scope of the present subject matter. Similarly, each step shown and described as performed by the management server 121 may be equivalently performed by an administrator or by both the administrator and the management server 121 in combination. To simplify the subsequent discussion, each step performed by the computing device 201 may be achieved at least in part by making an API call using the VHN API 301 of the client application 205. Similarly, each step performed by the management server 121 may be performed at least in part by making an API call using the backend API 401. In S501, the user 203 may receive initial login information. The initial login information may be conveyed to the user 203 via the computing device 201, such as e-mail, instant message, chat, website, print media, or the like. In S503, the user 203 may input the initial login information via the UI 309 of the client application 205 executing on the computing device 201. The client application 205 may transmit the initial login information to the backend application 217 of the management server 121 in S505. The management server 121 may determine, based on the received initial login information, whether the user 203 is registered as a member in S507. If not, an authentication error may occur in S509. If the user 203 is registered as a member, the management server 121 may determine whether the initial login information provided by the user in S505 matches the registration information that the management server 121 matches in S511. If not, an authentication error may occur in S509. If so, the user 203 may create a new password and set a contact e-mail in S513 via the UI 309 of the client application 205. In S515, the management server 121 may transmit a confirmation e-mail to the user 203, which may be received in S517. Subsequently, the computing device 201 may confirm the login information with the management server 121 in S519. For example, the user 203 may receive the confirmation e-mail and click a link to confirm. The management server 121 may then update the user 203 information in S521 to reflect the user's 203 new password and add additional information that the management server 121 may persist once confirmation has been received from the user 203.

Figure 6:
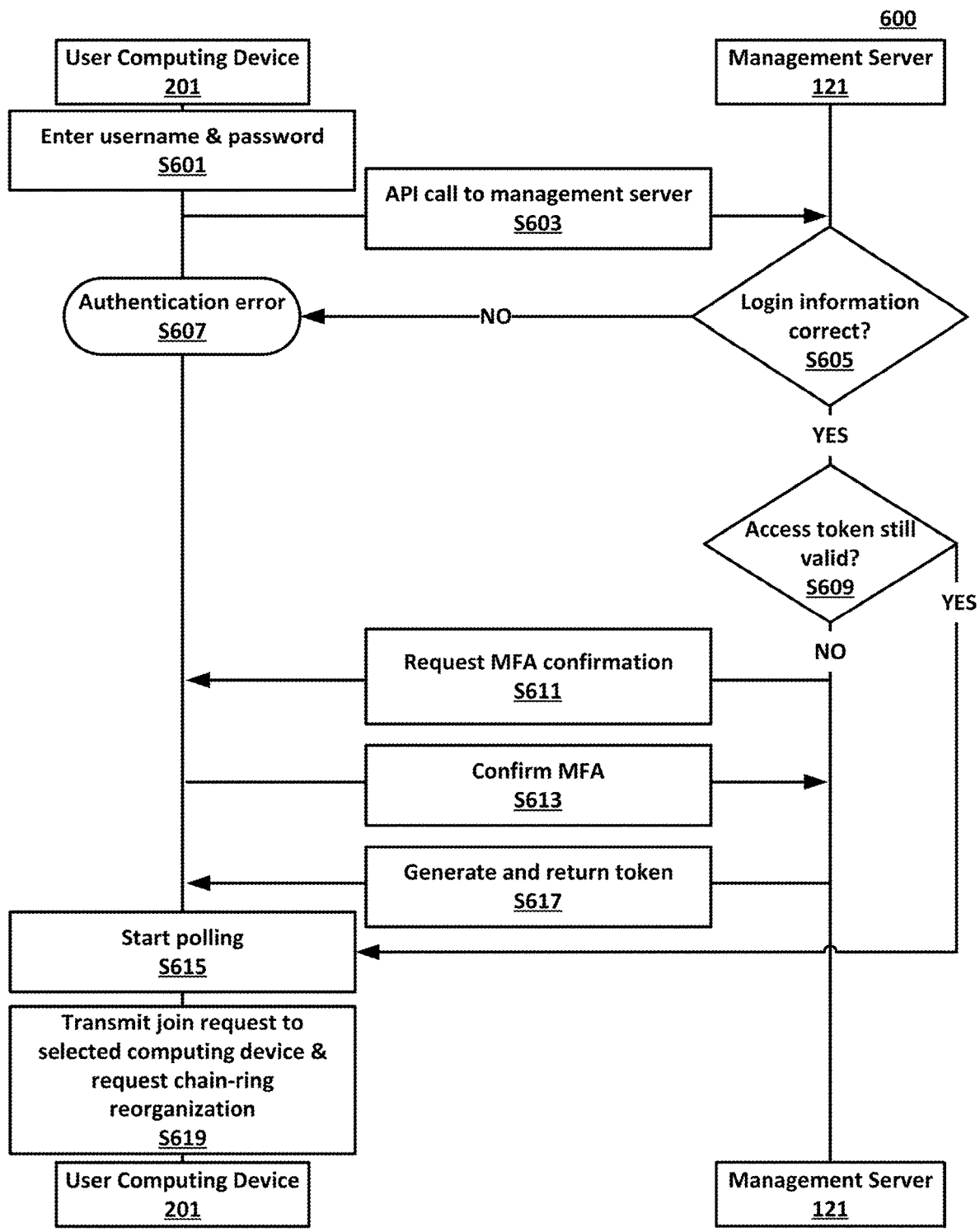
FIG. 6 illustrates a swim-lane diagram of an example authentication flow between a user computing device.

FIG. 6 illustrates a swim-lane diagram of an example authentication flow 600 between a user computing device (e.g., computing device 201) and the management server 121 where the user 203 is a returning member of the VHN 200 and the corresponding computing device 201 has previously logged in and previously received a Holon member inventory of all Holons that the computing device 201 is assigned to. It should be understood that each step shown and described as performed by the computing device 201 may be equivalently performed by the user 203 or by both the user 203 and the computing device 201 in combination without departing from the scope of the present subject matter. Similarly, each step shown and described as performed by the management server 121 may be equivalently performed by an administrator or by both the administrator and the management server 121 in combination. To simplify the subsequent discussion, it should be understood that each step performed by the computing device 201 may be achieved at least in part by making an API call using the VHN API 301 of the client application 205. Similarly, each step performed by the management server 121 may be performed at least in part by making an API call using the backend API 401. In S601, the user 203 may enter a username and password previously confirmed with the management server 121 in S519 using the UI 309 of the client application 205. The management server 121, upon receiving the login information, may determine whether the login information is correct in S605. If not, an authentication error may result in S607. If the login information is correct, the process may proceed to S609, where the management server 121 may determine whether an access token of the user 203 is still valid. If so, the process may proceed directly to S615 where the computing device 201 may begin polling. If the access token is no longer valid, the process may proceed to S611, where the management server 121 may request multi-factor authentication (MFA) confirmation from the user 203. In S613, the user 203 may confirm multi-factor authentication request. In S617, the management server 121 may generate and return a token to the computing device 201 of the user 203, which may allow the computing device 201 to begin polling in S615.

Following step S615, in step S619, the computing device 201 may select a random computing device from the Holon member inventory previously received and send a join request to this selected random computing device. The computing device 201 may further include the Holon member inventory as a payload with the join request. The join request may be propagated through the VHN 200 chain-ring by publishing a received request to each subsequent serially-connected spike of the chain-ring. Once the computing device 201 receives the join request that the computing device 201 had previously published; i.e., once the join request completes traversing the chain-ring, the computing device 201 may request execution of a Holon chain-ring creation algorithm by each (downstream) subscribing computing device in the VHN 200 chain-ring. Execution of the chain-ring creation algorithm may reorganize the VHN 200 chain-ring to integrate the requesting computing device 201 into the VHN 200 chain-ring.

The computing device 201 may also elect to actively logout from the decentralized hierarchical network system 100. To do so, the computing device 201 may send a logout notification to all other subscriber computing devices on the VHN 200 chain-ring. The logout notification may include an identifier of the logging-out computing device 201. The logout notification may be propagated through the VHN 200 chain-ring, where each (downstream) subscribing computing device may remove the logging out computing-device 201 from its Holon member inventory and continue to publish the request downstream to further subscribing computing devices. Once the computing device 201 receives the logout request that the computing device 201 had previously published, the computing device 201 may request execution of the Holon chain-ring creation algorithm as previously described. Execution of the chain-ring creation algorithm may reorganize the VHN 200 chain-ring to remove the computing device 201. The logged out computing device 201 may also inform management server 121 that the computing device 201 is no longer active.

The computing device 201 may also be passively logged out from the decentralized hierarchical network system 100. In this example, a publisher computing device may receive an error when transmitting data downstream to a subscribing computing device 201. The publisher computing device may add the computing device 201 to a preliminary inactive computing device list and publish the preliminary inactive computing device list to its remaining subscriber computing devices downstream. Each subscriber computing device receiving the preliminary inactive computing device list may indicate whether the computing device 201 is unreachable. If one computing device finds that all other publishers for the subscriber computing device 201 report the computing device 201 as unreachable, an active logout process may be automatically triggered for the computing device 201. The active logout process may begin when the one computing device sends out a logout notification on behalf of the computing device 201. This may be detected if the number of publishers in the inactive device list matches the number of devices in the publisher spike for the inactive computing device 201. If all publishers to a computing device report the computing device as non-reachable, then the non-reachable device may be logged off.

In some instances, the VHN 200 chain-ring may become broken when a publisher computing device determines that all subscribing computing devices downstream are no longer reachable (i.e., all directly downstream computing devices are no longer reachable). The publisher computing device may provide this information in a request to all members of a next spike in the chain. Each computing device in the VHN 200 may be aware of the structure of the chain-ring. Where an immediately downstream spike is unreachable, a computing device may open up a new communication channel to the immediately next downstream spike to submit this information. The request may be propagated through the VHN 200 chain-ring by publishing the received request consecutively from one spike to the next in the VHN 200 chain-ring. When the request finally returns to the original publisher computing device in a pre-defined time frame, it may be determined that only one spike of the VHN 200 chain-ring is broken. The original publisher computing device may then trigger an active logout process for the affected devices within the broken spike. On the other hand, if the request from the original publisher computing device does not return within the pre-defined time frame, the publisher computing device may broadcast a request to the entire VHN 200. All computing devices that respond to the broadcast request may be added to a new member inventory, which may be transmitted in a second broadcast request to execute the Holon chain-ring creation algorithm, which may reorganize the VHN 200 chain-ring as previously described.

As previously described, a user (e.g., 203) and his/her associated computing device 201 may be a member of more than one Holon and corresponding VHN 200. Accordingly, a technique to detect changes (e.g., data, chat, member inventory, etc.) may be needed; e.g., polling, publishing to subscribers, and the like. At the outset, it is noted that the decentralized hierarchical network system 100 may not allow delta merges of data; only full data replacements. In a case where a user (e.g., 203) of a computing device (e.g., 201) adds or replaces a document (and has access rights to do so) and sends a request to all downstream subscribing computing devices in the VHN 200 chain-ring, the request may be propagated around the chain-ring until it reaches the original publisher computing device 201. Each document may contain metadata such as a creation or update timestamp and a hash that is unique for the document version. The hash may be used to detect if changes have been made to a document. If two versions of a document have the same hash, they are the same document. Likewise, if two versions of a document have a different hash, they are different. Each subscribing computing device in the VHN 200 may hold a one timestamp as metadata for each VHN 200 it belongs to when the last update for documents have been received. A document inventory list may be sent along with the published request for new documents. Based on comparing the document inventory list and the timestamps (e.g., lowest timestamp first that is newer than the last timestamp of the Holon), with a locally stored document inventory list and timestamps, documents may be requested one-by-one when a computing device determines that the document does not exist or is not current within local file storage 303. For each successfully requested document, the last update timestamp for the subscribing computing device for that Holon may be updated. If a subscribing computing device receives a document a second time and the document has the same hash value, the subscribing computing device may refrain from transmitting it to subscribing computing devices downstream.

Figure 7:
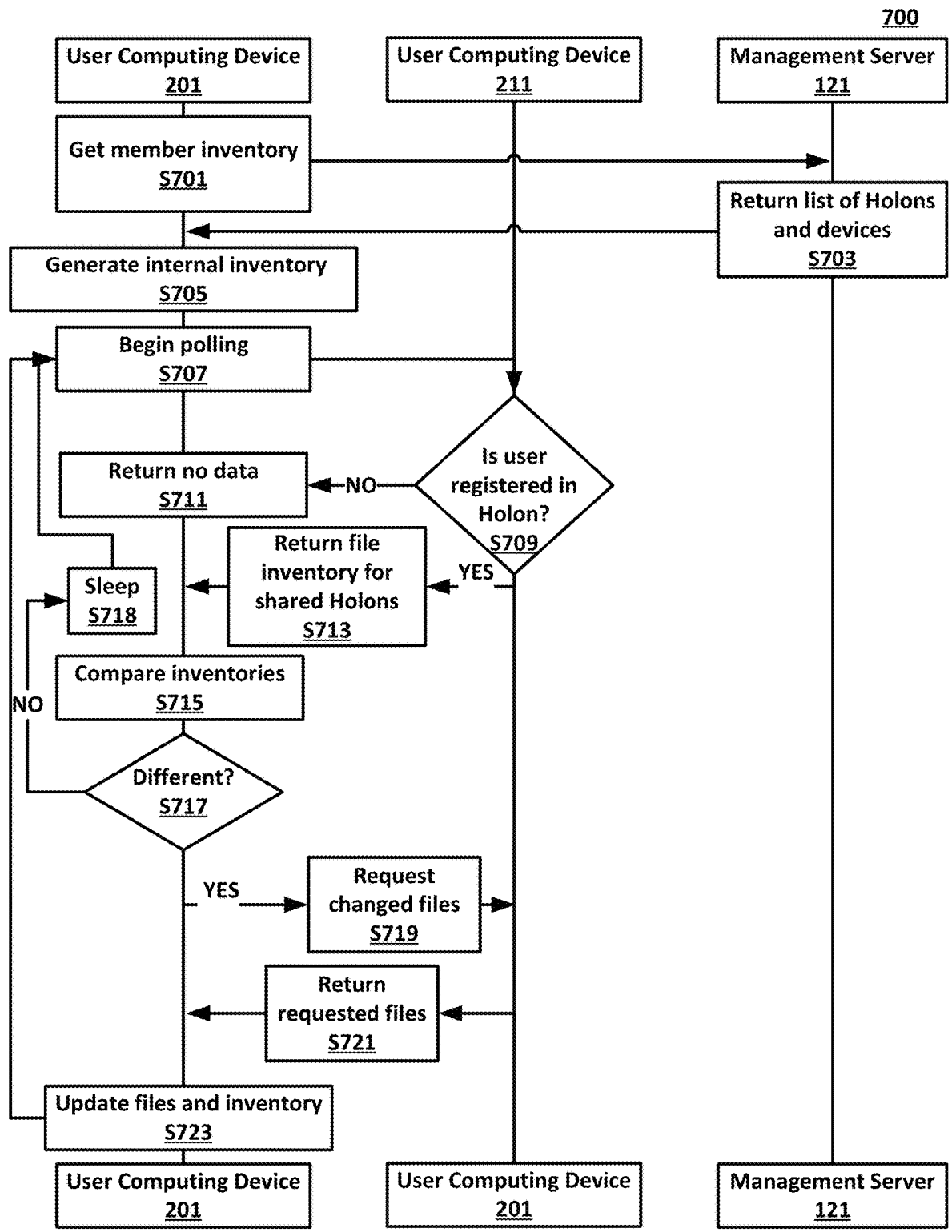
FIG. 7 illustrates a swim-lane diagram of an example decentralized file sharing flow between the management server and multiple user devices.

FIG. 7 illustrates a swim-lane diagram of an example decentralized file sharing flow 700 between the management server 121 and multiple user devices (e.g., 201, 211). It should be understood that each step shown and described as performed by the computing device 201 (and/or computing device 211) may be equivalently performed by the user 203 (and/or user 213) or by both the user 203 (and/or user 213) and the computing device 201 in combination without departing from the scope of the present subject matter. Similarly, each step shown and described as performed by the management server 121 may be equivalently performed by an administrator or by both the administrator and the management server 121 in combination. To simplify the subsequent discussion, it should be understood that each step performed by the computing device 201 (and/or computing device 211) may be achieved at least in part by making an API call using the VHN API 301 of the client application 205. Similarly, each step performed by the management server 121 may be performed at least in part by making an API call using the backend API 401. In S701, computing device 201 may query the management server 121 as to the member inventory of all active computing devices 201/211 and users within the same Holon(s) in which user 203 of the user computing device 201/211 is a member. In S703, the management server 121 may return a member inventory of active computing devices 201/211 within the same Holon(s) as computing device 201. In some instances, the management server 121 may not return the member inventory if it has a downtime, in which case a member inventory from a last login may be used instead. The computing device 201 may use this list to build an internal inventory of other computing devices in S705 and begin polling a computing device in S707, such as computing device 211, which is also a member of the same Holon. Upon receiving the poll request from computing device 201, computing device 211 may determine whether the user 203 of computing device 201 is a registered member of the Holon. If not, the computing device 211 may return no data in S711. If user 203 of computing device 201 is a registered member of the same Holon, the computing device 211 may return a file inventory in S713. The file inventory may correspond to files stored locally within the file storage 303 of the computing device 211. Upon receiving the file inventory in S713, the computing device 201 may compare the file inventory with a locally stored file inventory in S715. Comparing may include comparing both the existence of files as well as the last save dates and times (or version number) of each file. If no difference exists, as determined in S717, the process may sleep in S718 for a predetermine duration between zero and five seconds before returning to S707 where the computing device 201 may continue with polling another computing device of the same Holon as indicated by the list of Holon devices received in S703. If a difference does exist, as determined in S717, between the locally stored file inventory and the file inventory received in S713 from computing device 211, the computing device 201 may request the different files from computing device 211. In that request, both files that are missing from the locally stored file inventory of computing device 201 and files that have since been updated to a newer version may be transferred in S721 from computing device 211 to computing device 201. Finally, computing device 201 may update its local file inventory in local file storage 303 and return to S707 to continue polling other computing devices of the same Holon.

Figure 8:
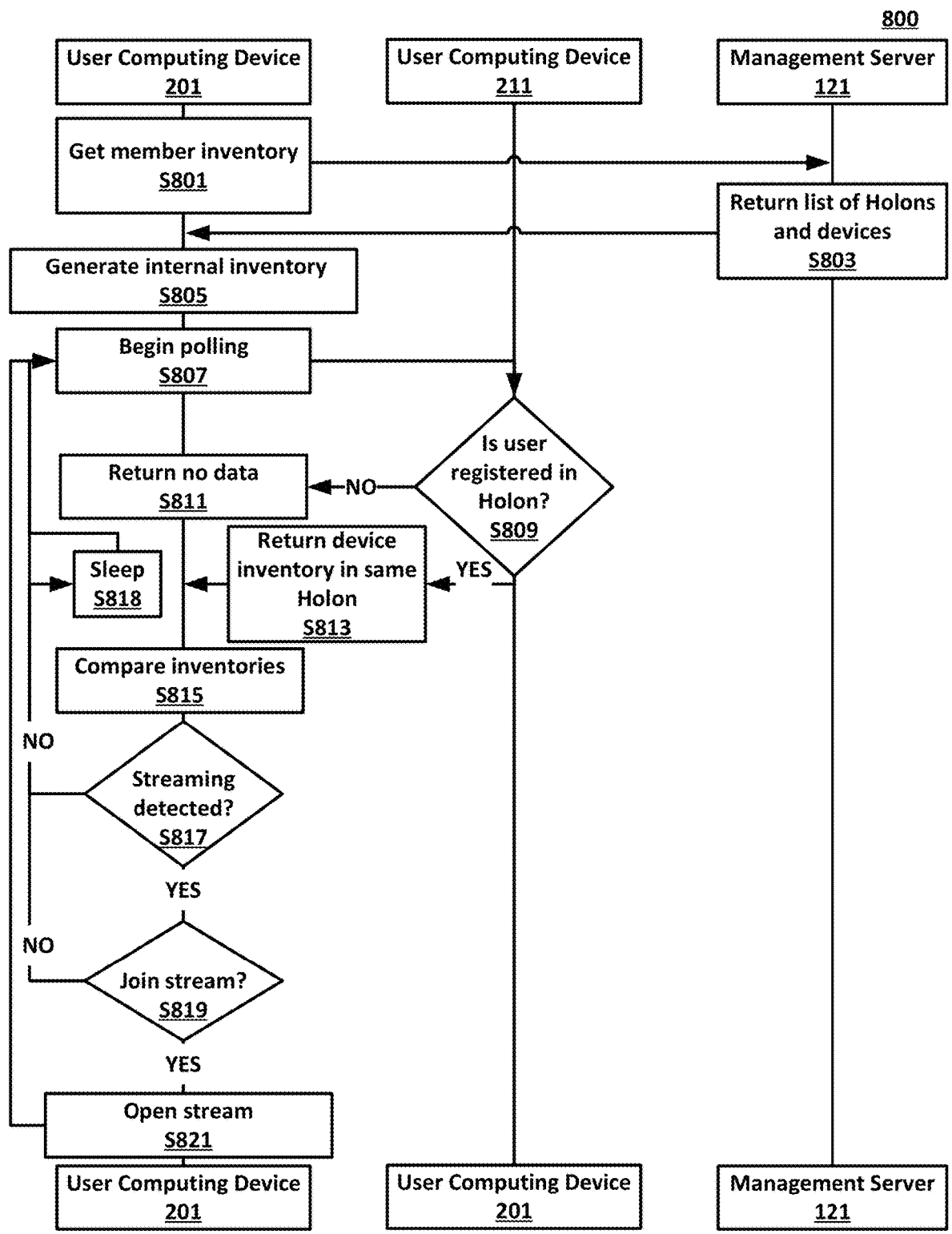
FIG. 8 illustrates a swim-lane diagram of an example streaming flow between the management server and multiple user devices.

FIG. 8 illustrates a swim-lane diagram of an example streaming flow 800 between the management server 121 and multiple user devices 201/211. It should be understood that each step shown and described as performed by the computing device 201 (and/or computing device 211) may be equivalently performed by the user 203 (and/or user 213) or by both the user 203 (and/or user 213) and the computing device 201 in combination without departing from the scope of the present subject matter. Similarly, each step shown and described as performed by the management server 121 may be equivalently performed by an administrator or by both the administrator and the management server 121 in combination. To simplify the subsequent discussion, it should be understood that each step performed by the computing device 201 may be achieved at least in part by making an API call using the VHN API 301 of the client application 205. Similarly, each step performed by the management server 121 may be performed at least in part by making an API call using the backend API 401. Once a member of a Holon becomes a "presenter" and begins streaming data, such as streaming video, audio, and/or a virtual whiteboard, other members of the same Holon may join and interact with the presenter. In S801, computing device 201 may query the management server 121 as to the member inventory of all active computing devices and users within the same Holon(s) in which user 203 of the user computing device 201 is a member. In S803, the management server 121 may return a member inventory list of active computing devices within the same Holon(s) as computing device 201. The computing device 201 may use this list to build an internal inventory of other computing devices in S805 and begin polling computing device(s) in S807, such as computing device 211, which may also be a member of the same Holon. Only users that are part of the internal inventory may join the VHN. Upon receiving the poll request from computing device 201, computing device 211 may determine whether the user 203 of computing device 201 is a registered member of the Holon and/or access rights information. If not, the computing device 211 may return no data in S811. If user 203 of computing device 201 is a registered member of the same Holon, the computing device 211 may return an inventory of computing devices of the same Holon in S813. Upon receiving the computing device inventory in S813, the computing device 201 may compare the inventory with a locally stored inventory in S815. While comparing, streaming may be detected in S817. If a computing device begins a stream, a notification of the starting stream may be propagated through the VHN similar to updates to files. Once a computing device of the VHN receives the notification that the streaming has begun by another device, it may determine a publishing computing device and begin viewing the stream. If no streaming is detected, the process may sleep in S818 for a predetermined duration between zero and five seconds before returning to S807 where the computing device 201 may continue with polling another computing device of the same Holon as indicated by the list of Holon devices received in S803. If streaming is detected, the user 203 of computing device 201 may decide whether to join the stream in S819. If not, the process may return to S807. If so, the stream may be opened in S821 where the computing device 201 may become a participant in the streaming session, and the process may return to S807.

Figure 9:
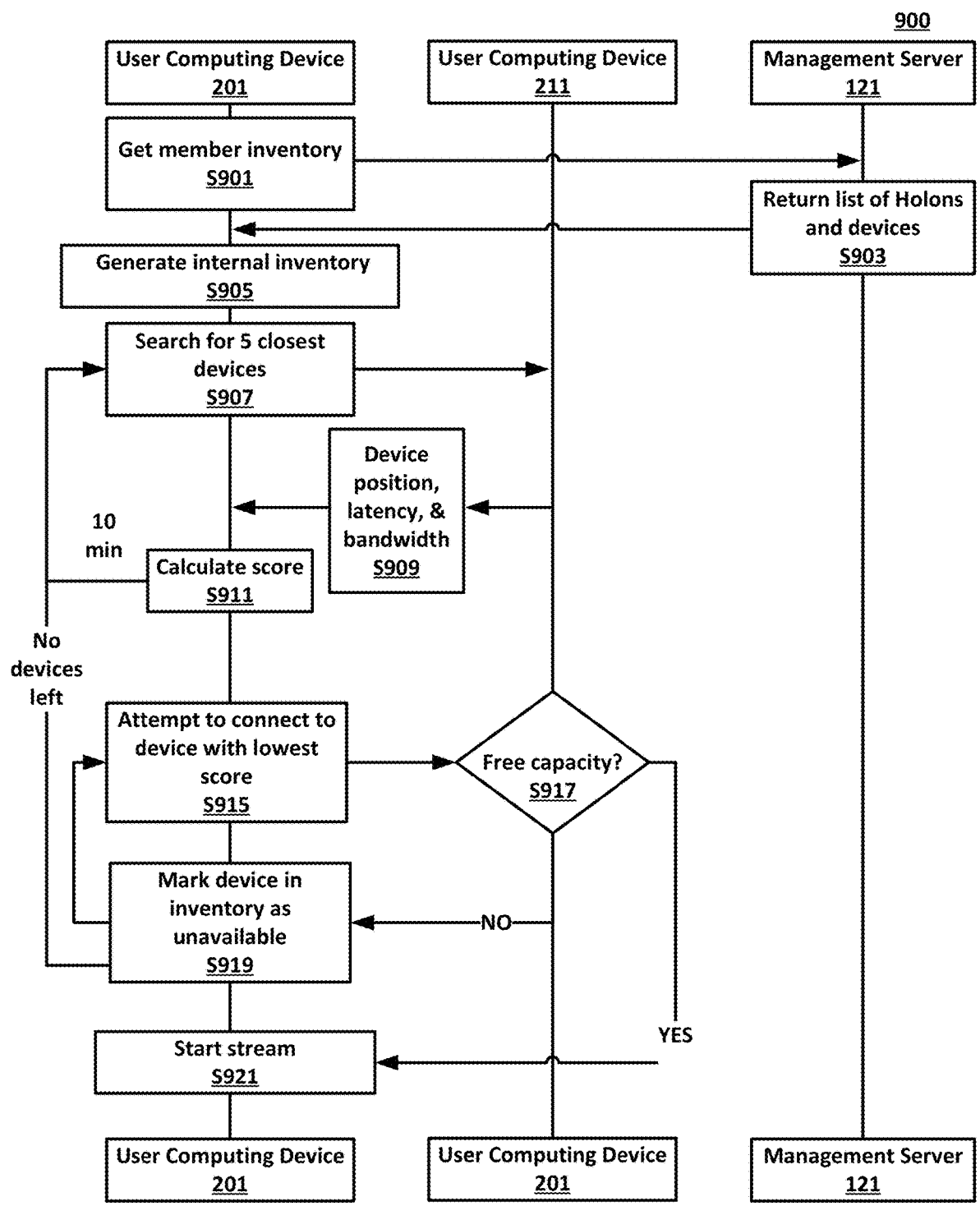
FIG. 9 illustrates a swim-lane diagram of an example flow to determine the streaming tree structure.

FIG. 9 illustrates a swim-lane diagram of an example flow 900 to determine the streaming tree structure previously identified. The algorithm shown in FIG. 9 may involve communications between management server 121 and multiple user devices 201/211. The algorithm may execute on all devices of the VHN 200 in the same manner and may not be centrally managed or controlled. As previously explained, different streaming trees may be calculated based on the computing device initiating the stream. A computing device score may vary based on its latency and bandwidth. In the case where only two computing devices participate in a stream, the stream may be initialized regardless of score. To simplify the subsequent discussion, it should be understood that each step performed by the computing device 201 (and/or computing device 211) may be achieved at least in part by making an API call using the VHN API 301 of the client application 205. Similarly, each step performed by the management server 121 may be performed at least in part by making an API call using the backend API 401. In S901, computing device 201 may query the management server 121 as to the member inventory of all active computing devices and users within the same Holon(s) in which user 203 of the user computing device 201 is a member. In S903, the management server 121 may return a member inventory list of active computing devices within the same Holon(s) as computing device 201. The computing device 201 may use this list to build an internal inventory of other computing devices S905. In S907, the computing device 201 may search for the five closest computing devices by polling each computing device indicated in the internal inventory for position, bandwidth, and latency. Each computing device, including user computing device 211 may respond in S909 with its position, latency, and bandwidth. Using this information, computing device 201 may calculate a score in S911. Steps S907 through S911 may be repeated periodically, such as every ten minutes, to maintain an updated computing device inventory. Computing device 201 may iterate through inventory and begin streaming to another computing device when the other computing device has capacity to do so. Alternatively, computing device 201 may mark another computing device as unavailable when the other computing device has no capacity. If all computing devices in its internal inventory are unavailable, computing device 201 may execute the search in S907 again. After calculating the computing device score in S911, computing device 201 may attempt to connect to the device having the lowest score in S915, where the lowest score may indicate any suitable performant combination of latency and bandwidth. In an example, the score may be a latency rank multiplied by a bandwidth rank. Assuming for the purpose of discussion that the computing device 211 has the lowest calculated score, computing device 211 may determine, in response to a connection request from computing device 201, whether it has free capacity to stream in S917. In S919, if no free capacity exists, computing device 211 may be marked as unavailable in its internal inventory generated in S905. If the computing device 211 does have free capacity, streaming may commence in S921 from the computing device 201 to computing device 211, or vice versa.

Figure 10:
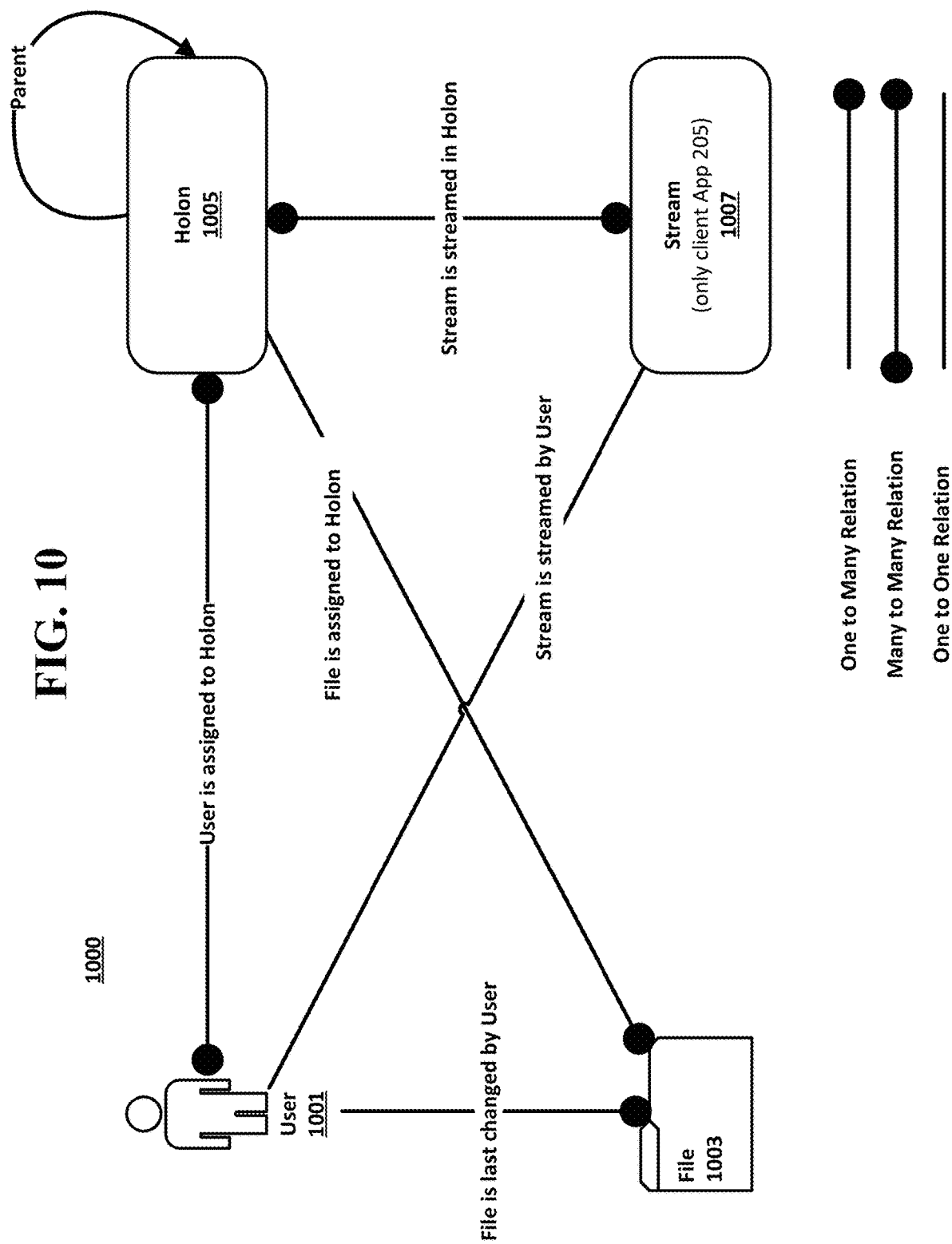
FIG. 10 illustrates an overview of the types of relationships that may exist between a user, a Holon, a file, and a stream.

FIG. 10 illustrates an overview 1000 of the types of relationships that may exist between a user 1001, a Holon 1005, a file 1003, and a stream 1007. As shown in FIG. 10, many users 1001 may be assigned to many Holons 1005. All users 1001 may be part of a first Holon (e.g., school Holon 109). Each user 1001 may be assigned to many other sub-Holons, as long as the user and the sub-Holon are members of the same parent Holon. A single user 1001 may be assigned to multiple Holons 1005, and many users 1001 may be assigned to a single Holon 1005. Between users 1001 and files 1003, a single user 1001 may be the last user to change many files 1003, but a file 1003 may only have one user who was last to change the file 1003. Between files 1003 and Holons 1005, many files 1003 may be assigned to a single Holon 1005, but a single file 1003 may not be assigned to many Holons 1005. This relationship reinforces the principle that data may not be shared across Holons. The data stored in and assigned to a Holon 1005 may be considered secure within that Holon 1005. Between Holons 1005 and streams 1007, a single Holon 1005 may support many streams 1007, and a single stream 1007 may only occur across in a single Holon 1005. Between users 1001 and streams 1007, only a single user 1001 may provide a single stream 1007 at a time. Multiple users 1001 may not provide a single stream 1007, and a single user 1001 may not provide multiple streams 1007.

Figure 11:
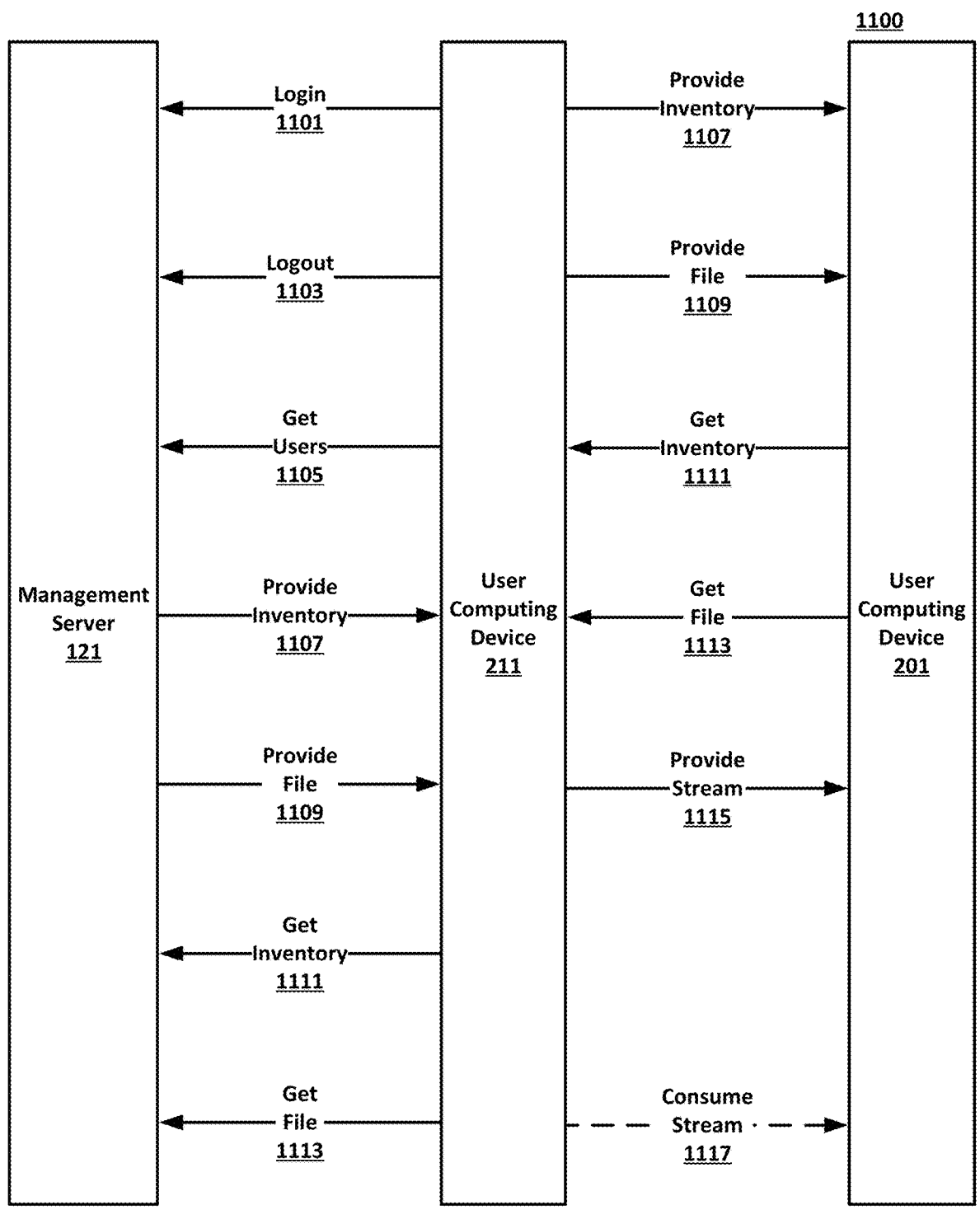
FIG. 11 illustrates a summary of example communications that may occur between two computing devices and the management server.

FIG. 11 illustrates a summary 1100 of example communications that may be occur between two computing devices 201/211 and the management server 121. It should be understood that FIG. 11 merely reflects a listing of communications and does not represent a particular sequence or request/response relationship. For instance, any computing device, such as computing device 211, may send Login 1101, Logout 1103, Get Users 1105, Get Inventory 1107, and Get File 1113 requests to the management server 121. The management server 121 may respond to the requests of the computing device with Provide Inventory 1107 and Provide File 1109. Between computing devices, a computing device may send Get Inventory 1111 and Get File 1113 requests. A computing device may respond to these requests with Provide Inventory 1107 and Provide File 1109. Computing devices may also Provide Stream 1115 and Consume Stream 1117. Login 1101 and Logout 1103 may allow a computing device to participate on and withdraw from the VHN 200.

Get Users 1105 may request the Holon member inventory, including a list of users and/or devices within the same Holon(s) as the requesting user as previously defined. Get Inventory 1111 may request a file inventory corresponding to files stored within the same Holon(s) as the requesting user. Provide Inventory 1107 may return the file inventory to the requesting computing device. Get File 1113 may request a particular file that was determined to be either missing or out-of-date on the computing device of the requesting user after comparing the local file inventory with one received in response to Get Inventory 1111. Provide File 1109 may return the requested file to the requesting computing device. Provide Stream 1115 may allow a computing device to provide source information for streaming. Consume Stream 1117 may allow a computing device to view an active stream.

Setup and configuration of the decentralized hierarchical network system 100 may be straightforward and require only minimal information to prepare the system for operation. In general, the network may be named and a top-level Holon configured. The administrator account, including a username and password may be configured. A mail server may also be configured. Following these steps, the decentralized hierarchical network system 100 may be ready for use.

Figure 12:
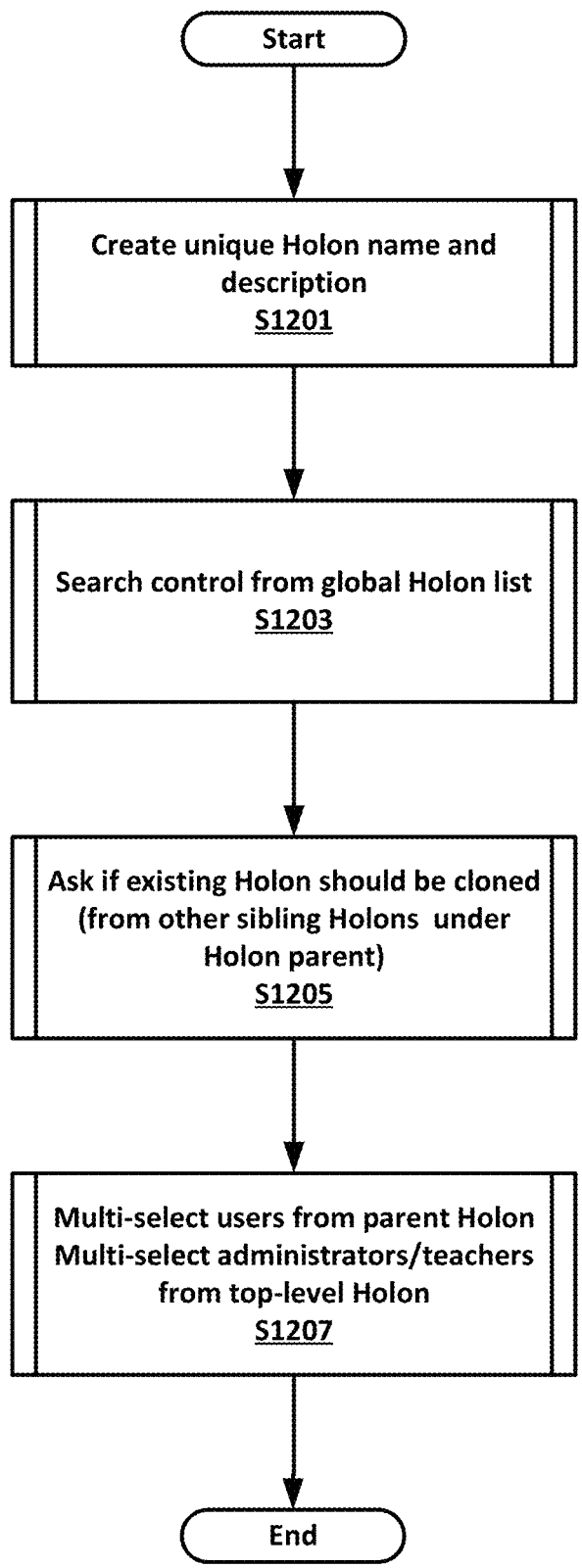
FIG. 12 illustrates an example process flow to create a new Holon by making requests to management server.

FIG. 12 illustrates an example process flow 1200 to create a new Holon and associated VHN 200 by making requests to management server 121. In S1201, a unique Holon name and description may be created. Where the new Holon is the first, topmost-level Holon, any name may be used. Where the new Holon is a sub-Holon of at least one other sub-Holon of a same parent Holon, the new Holon may be required to have a unique name. In S1203, a search control is executed from a global Holon list. Only members of the same parent Holon may be assigned to a sub-Holon. In S1205, the management server 121 may ask whether an existing Holon should be cloned from another "Holon sibling" under the same parent to save time. In S1207, users, administrators, and teachers may be selected from the top-level Holon to become members of a sub-Holon. In the case where the new Holon being created is the first, topmost-level Holon, no prior Holon members may exist that are selectable from a parent Holon.

Data access rights may be configured on a user-level and/or file-level basis. In the user-level configuration, users may be assigned specific roles, such as administrator, teacher, Holon creator, or student. Users with no role assignment may be unable to perform any data access operations. Administrators may have rights to create, edit, and delete Holons and sub-Holons, for example. In the file-level configuration, each file may be tagged with access rights. In one example, a teacher and Holon creator may have rights to perform all data access operations on all files, including creating files, updating/editing files, deleting files, and reading files. A teacher and/or Holon creator may tag a file to provide additional rights to other Holon members. For instance, a plurality of homework submission files may be created for each student user in a course Holon and tagged such that only a single student and the teacher may be allowed to perform data operations on the homework submission file. Other students may have respective data operations privileges only on their homework submission files and may be prohibited from reading the homework submission files of other student users.

Figure 13:
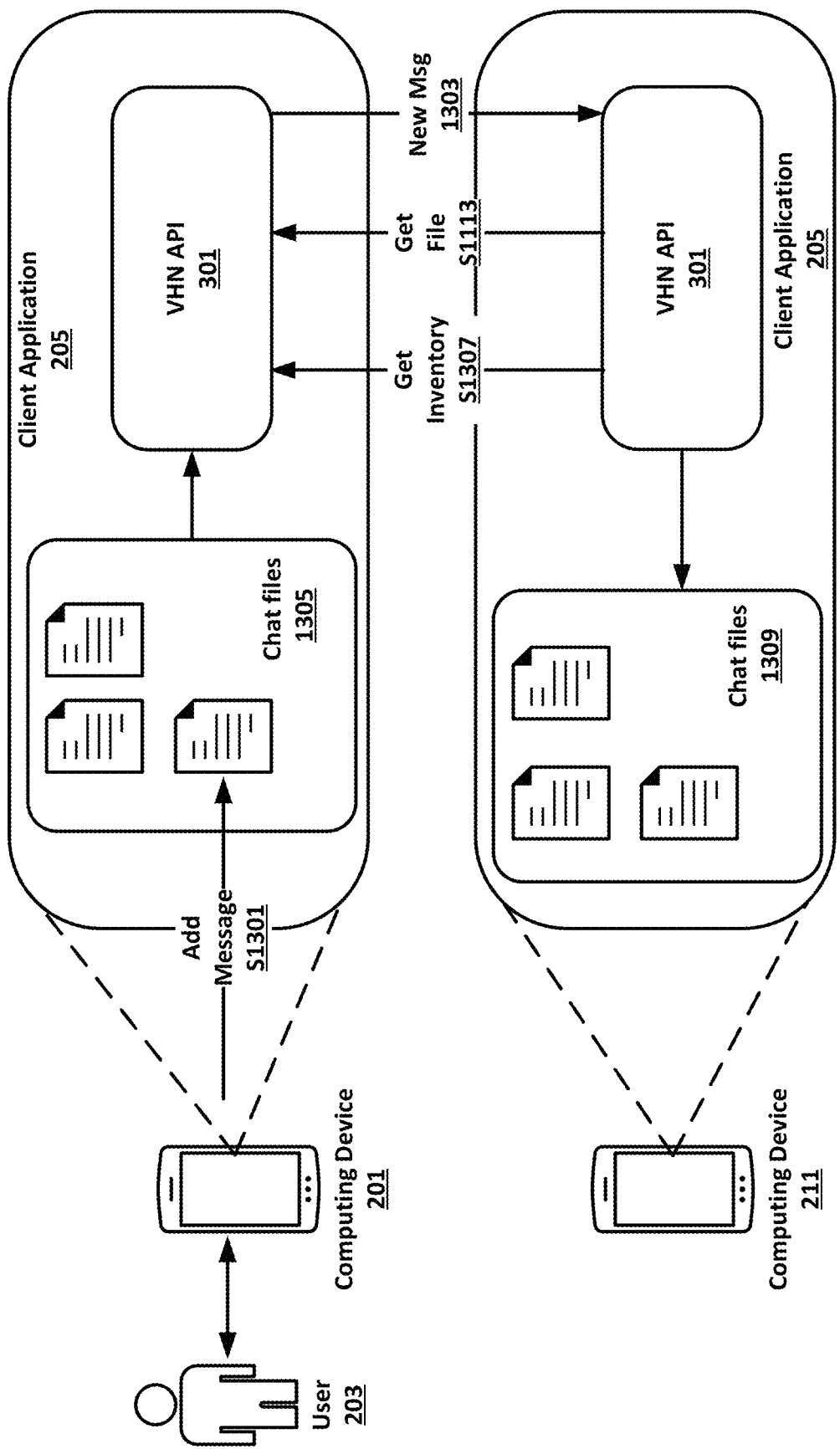
FIG. 13 illustrates a block diagram showing propagation of a chat message from a user of one computing device to another computing device.

The decentralized hierarchical network system 100 may support chat and/or text message communication between members of a Holon. FIG. 13 illustrates a block diagram 1300 showing propagation of a chat message from a user 203 of one computing device 201 to another computing device 211. The client application(s) 205 on each computing device 201/211 may each store a plurality of chat files 1305/1309. Chat files 1305/1309 may be structured as one or more text files. When a user 203 opens a new chat, a new chat file 1305/1309 may be created. Where the user 203 continues a previously-existing chat, additional text may be appended to an existing chat file 1305/1309. The text files may be handled internally by the VHN API 301 and may not be accessed by the user directly. Chat files 1305/1309 may be partitioned by message during transfer to reduce the I/O burden. Chat files 1305/1309 may contain a watermark that indicates when a chat file 1305/1309 was last updated. As shown in FIG. 13, a user 203 may compose a chat message 1303 using the UI of computing device 201. In S1301, the message 1303 may be added as a new message 1303 to a chat file 1305 within the file storage 303 data repository of the computing device 201, as previously described. Another computing device 211 may transmit a Get Inventory request in S1307 using its VHN API 301, which may be processed by the corresponding VHN API 301 of computing device 201. In response to receiving the Get Inventory request in S1307, the VHN API 301 of computing device 201 may detect that the chat file 1305 watermark is newer than the chat file 1309 watermark. In response the VHN API 301 of computing device 211 may subsequently transmit a Get File 1113 request to the computing device 201 to retrieve the newer chat file 1305. The VHN API 301 of computing device 201 may subsequently transmit the new message 1303 to the computing device 211, which may be used to update chat file 1309.

The decentralized hierarchical network system 100 may be implemented with additional, different, or fewer components. For instance, the decentralized hierarchical network system 100 include additional computing devices, Holons, and/or management servers to support execution of the functions disclosed in accordance with the present subject matter.

The logic illustrated in the flow diagrams may include additional, different, or fewer operations than illustrated. The operations illustrated may be performed in an order different than illustrated.

The methods, devices, processing, circuitry, and logic described above and in the specific illustrative examples below may be implemented in many ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, in hardware, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a non-transitory computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many ways, and may be implemented in many ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Figure 15:
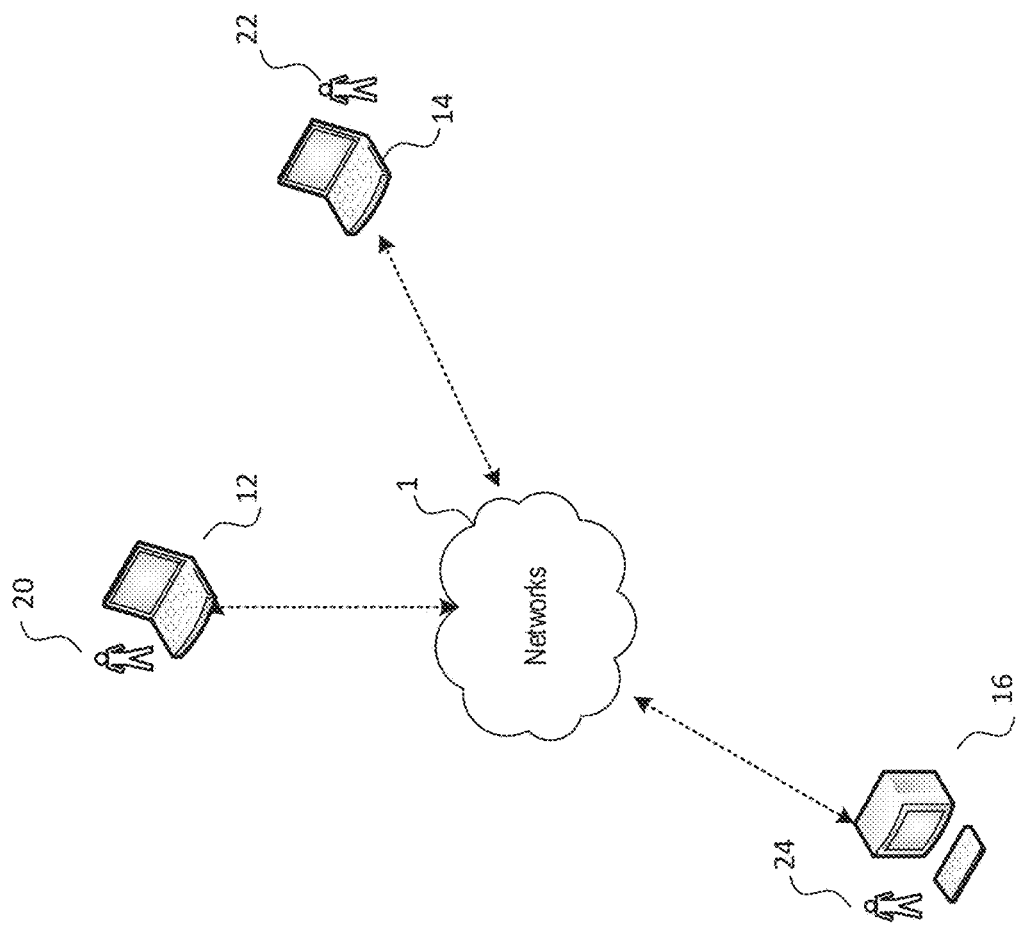
FIG. 15 illustrates an example electronic communication environment for implementing the decentralized hierarchical network.

FIG. 15 shows an example electronic communication environment 10 in which a decentralized hierarchical network system 100 may be implemented. The electronic communication environment 10 may include a portion or all the following: one or more user devices 12, 14, and 16 associated with users 20, 22, and 24, and one or more databases 18, in communication with each other via public or private communication networks 1.

The user devices 12, 14, and 16 may be any form of mobile or fixed electronic devices including but not limited to desktop personal computer, laptop computers, tablets, mobile phones, personal digital assistants, or the like.

Figure 16:
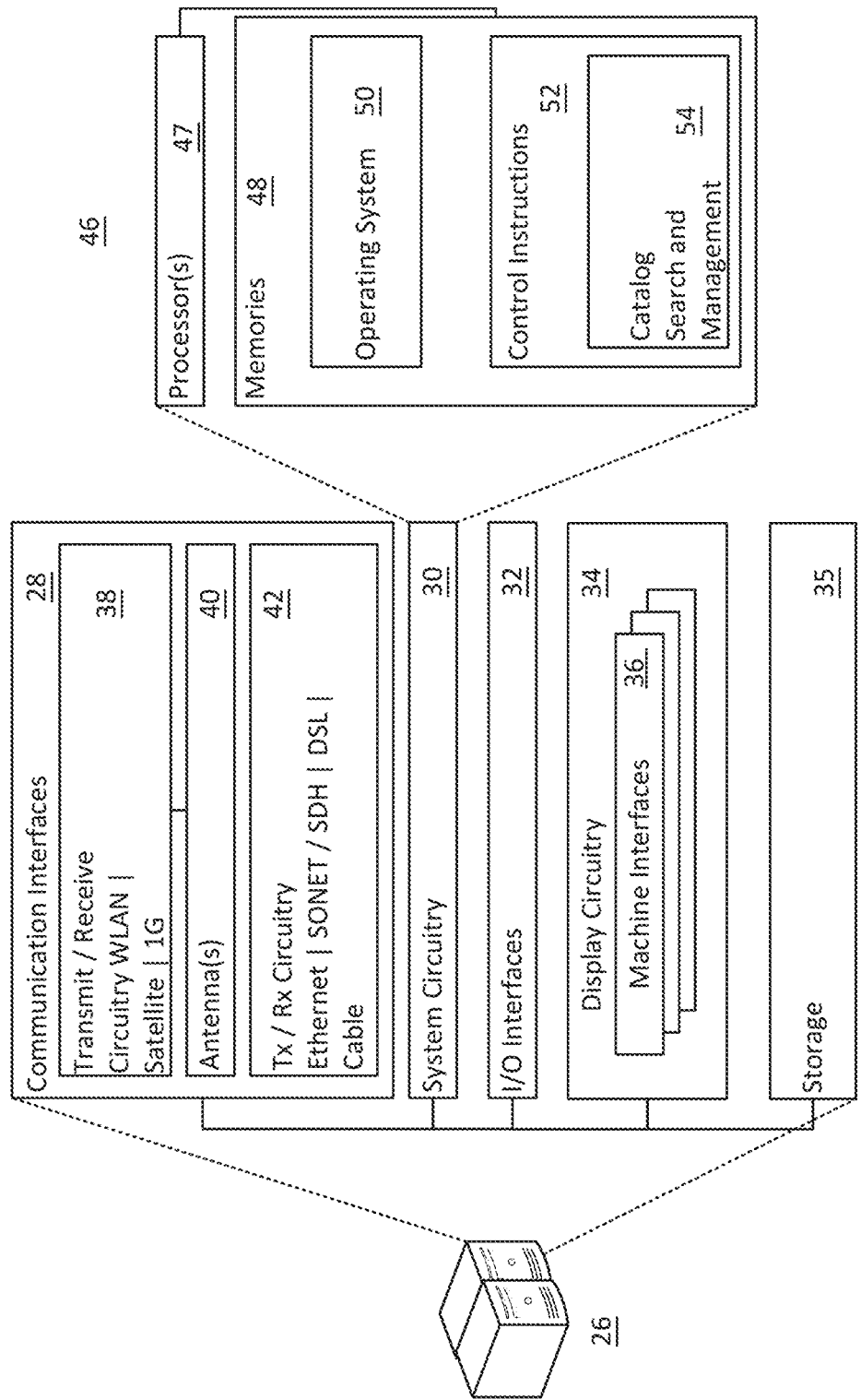
FIG. 16 illustrates computer systems that may be used to implement various components of the decentralized hierarchical network.

FIG. 16 shows an example computer system 26 for implementing the user devices 12, 14, and 16. The computer system 26 may include communication interfaces 28, system circuitry 30, input/output (I/O) interfaces 32, storage/memory 35, and display circuitry 34 that generates machine interfaces 36 locally or for remote display, e.g., in a web browser running on a local or remote machine. The machine interfaces 36 and the I/O interfaces 32 may include GUIs, touch sensitive displays, voice or facial recognition inputs, buttons, switches, speakers and other user interface elements. Additional examples of the I/O interfaces 32 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 28 may include wireless transmitters and receivers ("transceivers") 38 and any antennas 40 used by the transmitting and receiving circuitry of the transceivers 38. The transceivers 38 and antennas 40 may support Wi-Fi network communications, for instance, under any version of IEEE 802.11, e.g., 802.11n or 802.11 ac. The communication interfaces 28 may also include wireline transceivers 42. The wireline transceivers 42 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage/memory 35 may be used to store various initial, intermediate, or final data or model for implementing the decentralized hierarchical network system 100. The storage/memory 35 may be centralized or distributed, and may be local or remote to the computer system 26. For example, the storage/memory 35 may be hosted remotely by a cloud computing service provider.

The system circuitry 30 may include hardware, software, firmware, or other circuitry in any combination. The system circuitry 30 may be implemented, for example, with one or more systems on a chip (SoC), application specific integrated circuits (ASIC), microprocessors, discrete analog and digital circuits, and other circuitry.

For example, the system circuitry 30 may be implemented as 46 for the decentralized hierarchical network system 100. The system circuitry 30 may include one or more processors 47 and memories 48. The memories 48 stores, for example, control instructions 52 and an operating system 50. The control instructions 52, for example may include instructions for implementing the components 54 of the decentralized hierarchical network system 100. In one implementation, the instruction processors 47 execute the control instructions 52 and the operating system 50 to carry out any desired functionality related to the decentralized hierarchical network system 100.

To clarify the use of and to hereby provide notice to the public, the phrases "at least one of <A>, <B>, ... and <N>" or "at least one of <A>, <B>, ... or <N>" or "at least one of <A>, <B>, ... <N>, or combinations thereof" or "<A>, <B>, ... and/or <N>" are defined by the Applicant in the broadest sense, superseding any other implied definitions hereinbefore or hereinafter unless expressly asserted by the Applicant to the contrary, to mean one or more elements selected from the group comprising A, B, ... and N. In other words, the phrases mean any combination of one or more of the elements A, B, ... or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

What is claimed is:

1. A virtual network comprising:
    a plurality of computing devices disposed in a unidirectional communication ring comprising a plurality of serially-connected spikes, wherein
        each spike comprises:
            n computing devices, and
            n×p connections directly connecting each of the n computing devices to p downstream computing devices; and
        each computing device is configured to:
            request and receive an inventory of the plurality of computing devices;

select a computing device from the plurality of computing devices;

transmit a join request comprising the inventory to the selected computing device; and request reorganizing the unidirectional communication ring in response to receipt of the transmitted join request after propagation through each of the plurality of spikes of the unidirectional communication ring.

2. The virtual network of claim 1, wherein each computing device is further configured to:

propagate a request received from an upstream computing device to a downstream computing device along the unidirectional communication ring.

3. The virtual network of claim 1, wherein each computing device is further configured to:

transmit a logout notification to a downstream computing device;

remove a computing device from the inventory in response to receipt of a logout notification; and request reorganization of the ring in response to receipt of the transmitted logout notification after propagation through at least some of the plurality of spikes of the unidirectional communication ring.

4. The virtual network of claim 1, wherein each computing device is further configured to:

receive an error in response to transmission of data to a downstream computing device;

transmit an inactive computing device list to another downstream computing device;

report that the downstream computing device is unreachable in response to receipt of the inactive computing device list; and trigger an automatic logout process for the downstream computing device in response to all other computing devices reporting that the downstream computing device is unreachable.

5. The virtual network of claim 1, wherein each computing device is further configured to:

determine that all directly downstream computing devices are unreachable;

transmit a request to a spike of the directly downstream computing devices; and trigger an active logout process for the unreachable directly downstream computing devices in response to receipt of the request within a pre-defined time frame.

6. The virtual network of claim 1, wherein each computing device is further configured to:

create and store a file in a computer-readable memory;

transmit a request comprising a first inventory associated with the file to a spike of downstream computing devices;

receive a request comprising a second inventory associated with a second file; and request the second file based on comparing the second inventory with the first inventory.

7. The virtual network of claim 1, wherein each computing device is further configured to:

transmit a request for a member inventory to a spike of downstream computing devices;

receive a computing device inventory comprising a streaming indication of a stream being streamed by a computing device in response to the request; and join the stream.

8. The virtual network of claim 1, wherein each computing device is further configured to:

determine a subset list of computing devices based on the inventory;

transmit a request to the subset of computing devices for position, latency, and bandwidth;

receive a response from a subset of computing devices identified in the subset list of computing devices, the response comprising the position, the latency, and the bandwidth;

determine a lowest scoring computing device of the subset of computing devices based on the response;

determine that the lowest scoring computing device has no free capacity to stream; and indicate the lowest scoring computing device as unavailable in the subset list.

9. The virtual network of claim 1, wherein each computing device is further configured to:

generate a first chat message;

append the first chat message to a second chat message stored in a chat file in a computer-readable memory, wherein the chat file comprises a watermark;

receive an update request;

transmit the watermark, in response to the update request, to a spike of downstream computing devices; and transmit the chat file to the spike of downstream computing devices.

10. The virtual network of claim 1, wherein the unidirectional communication ring is a first unidirectional communication ring, and the virtual network further comprises:

a management server configured to:

receive a request to create a second unidirectional communication ring;

assign a subset of the plurality of computing devices to the second unidirectional communication ring; and for each of the spikes of the second unidirectional communication ring, select each computing device of the subset based on a respective latency of each of the computing devices in the subset.

11. A method of configuring a virtual network comprising unidirectional communication ring, comprising:

requesting and receiving an inventory of a plurality of computing devices communicably coupled by a plurality of spikes in the unidirectional communication ring;

selecting a computing device from the plurality of computing devices;

transmitting a join request comprising the inventory to the selected computing device; and requesting reorganizing of the unidirectional communication ring in response to receiving the transmitted join request after propagating the join request through at least some of the plurality of spikes of the unidirectional communication ring.

12. The method of claim 11, further comprising:

propagating a request received from an upstream computing device to a downstream computing device along the unidirectional communication ring.

13. The method of claim 11, further comprising:

transmitting a logout notification to a downstream computing device;

removing a computing device from the inventory in response to receiving a logout notification; and requesting reorganizing of the unidirectional communication ring in response to receiving the transmitted logout notification after propagating through each of the plurality of spikes of the unidirectional communication ring.

14. The method of claim 11, further comprising:
receiving an error when transmitting data to a downstream computing device;
transmitting an inactive computing device list to another downstream computing device;
reporting that the downstream computing device is unreachable in response to receiving the inactive computing device list; and
triggering an automatic logout process for the downstream computing device in response to all other computing devices reporting that the downstream computing device is unreachable.

15. The method of claim 11, further comprising:
determining that all directly downstream computing devices are unreachable;
transmitting a request to a spike of downstream computing devices; and
triggering an active logout process for the directly downstream computing devices determined to be unreachable in response to receiving the request within a pre-defined period.

16. The method of claim 11, further comprising:
creating and storing a file in a non-transitory computer-readable memory;
transmitting a request comprising a first inventory associated with the file to a spike of downstream computing devices;
receiving a request comprising a second inventory associated with a second file; and
requesting the second file based on comparing the second inventory with the first inventory.

17. The method of claim 11, further comprising:
transmitting a request for a file inventory to a spike of downstream computing devices;
receiving a file inventory comprising a streaming indication of a stream being streamed by a computing device in response to the request; and
joining the stream.

18. The method of claim 11, further comprising:
determining a subset list of computing devices based on the inventory;
transmitting a request to the subset of computing devices for position, latency, and bandwidth;
receiving a response from a subset of computing devices identified in the subset list of computing devices comprising the position, the latency, and the bandwidth;
determining a lowest scoring computing device of the subset of computing devices based on the response;
determining that the lowest scoring computing device has no free capacity to stream; and
indicating the lowest scoring computing device as unavailable in the subset list.

19. The method of claim 11, further comprising:
generating a first chat message;
appending the first chat message to a second chat message stored in a chat file in a non-transitory computer-readable memory, wherein
the chat file comprises a watermark;
receiving an update request;
transmitting the watermark in response to the update request to a spike of downstream computing devices; and
transmitting the chat file to the spike of downstream computing devices.

20. The method of claim 11, wherein
the unidirectional communication ring is a first unidirectional communication ring, and the method further comprises:
receiving a request to create a second unidirectional communication ring;
assigning a subset of computing devices to the second unidirectional communication ring; and
for each of the spikes of the second unidirectional communication ring, selecting each computing device of the subset based on a respective latency of each of the computing devices in the subset.

* * * * *